United States Patent
Chang et al.

(10) Patent No.: US 11,552,699 B2
(45) Date of Patent: *Jan. 10, 2023

(54) GROUND TERMINALS VIA REMOTE DIGITAL-BEAM-FORMING NETWORKS FOR SATELLITES IN NON-GEOSTATIONARY ORBIT

(71) Applicant: SPATIAL DIGITAL SYSTEMS, INC., Agoura Hills, CA (US)

(72) Inventors: Donald C.D. Chang, Thousand Oaks, CA (US); Juo-Yu Lee, Westlake Village, CA (US); Steve K. Chen, Pacific Palisades, CA (US)

(73) Assignee: SPATIAL DIGITAL SYSTEMS, INC., Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,685

(22) Filed: Nov. 18, 2019

(65) Prior Publication Data

US 2020/0091997 A1 Mar. 19, 2020

Related U.S. Application Data

(63) Continuation of application No. 15/866,457, filed on Jan. 9, 2018, now Pat. No. 10,484,081, which is a (Continued)

(51) Int. Cl.
*H04J 14/00* (2006.01)
*H04B 7/185* (2006.01)
(Continued)

(52) U.S. Cl.
CPC ....... *H04B 7/18517* (2013.01); *H04B 7/0452* (2013.01); *H04B 7/0617* (2013.01);
(Continued)

(58) Field of Classification Search
CPC ............ H04B 7/18517; H04B 10/2575; H04B 7/0617; H04B 7/0452; H04B 7/2041; H04W 52/42; H04L 27/265; H04N 7/20
(Continued)

(56) References Cited

U.S. PATENT DOCUMENTS

2015/0009892 A1* 1/2015 Chang ................. H04B 7/0452
370/328
2017/0054482 A1* 2/2017 Forenza ............... H04B 7/0626
2018/0248639 A1* 8/2018 He ......................... H04B 7/024

* cited by examiner

*Primary Examiner* — Don N Vo
(74) *Attorney, Agent, or Firm* — Phuong-Quan Hoang

(57) ABSTRACT

A MIMO basestation for a cellular communications system comprises a remote indoor processing facility coupled to an outdoor RF tower via optical fibers. The remote indoor processing facility includes a bank of RF modulators to modulate signal streams; a remote MIMO transmitting processor that includes a remote digital beam-forming network to transform the modulated signal streams into transmit beam signals; a pre-processor to perform a wavefront multiplexing transform on the transmit beam signals to generate wavefront multiplexed beam signals, each of the wavefront multiplexed beam signals being a linear combination of the transmit beam signals; and RF-to-optical drivers to perform optical modulating functions on the wavefront multiplexed beam signals to generate optical waveform streams.

20 Claims, 19 Drawing Sheets

Related U.S. Application Data continuation-in-part of application No. 14/993,442, filed on Jan. 12, 2016, now Pat. No. 9,866,300.

(60) Provisional application No. 62/247,907, filed on Oct. 29, 2015.

(51) Int. Cl.
| | |
|---|---|
| *H04B 7/0452* | (2017.01) |
| *H04B 7/06* | (2006.01) |
| *H04B 10/2575* | (2013.01) |
| *H04B 7/204* | (2006.01) |
| *H04N 7/20* | (2006.01) |
| *H04L 27/26* | (2006.01) |
| *H04W 52/42* | (2009.01) |

(52) U.S. Cl.
CPC ....... *H04B 7/2041* (2013.01); *H04B 10/2575* (2013.01); *H04L 27/265* (2013.01); *H04N 7/20* (2013.01); *H04W 52/42* (2013.01)

(58) Field of Classification Search
USPC .......................................................... 398/43
See application file for complete search history.

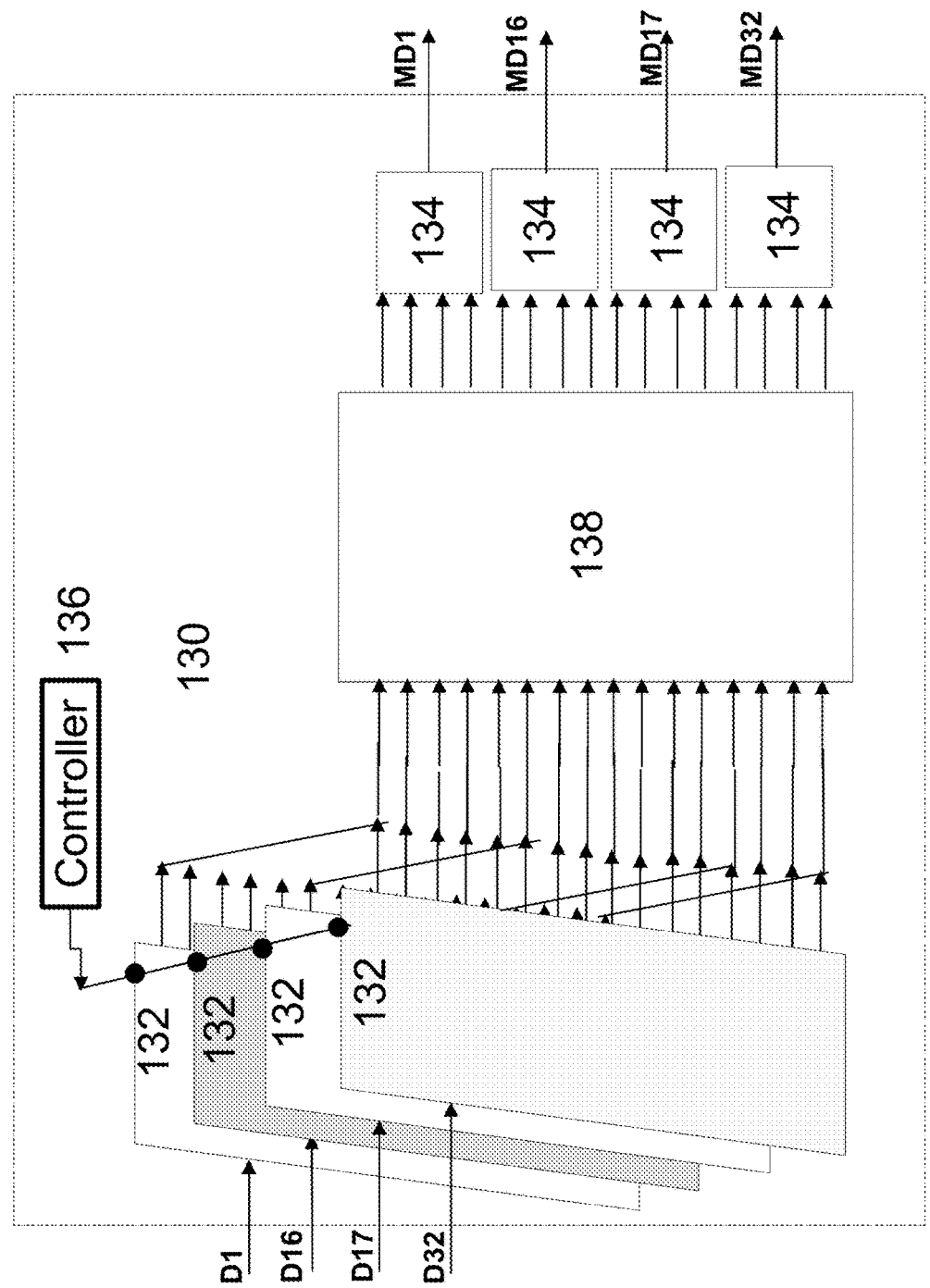

GROUND TERMINALS VIA REMOTE DIGITAL-BEAM-FORMING NETWORKS FOR SATELLITES IN NON-GEOSTATIONARY ORBIT

CROSS-REFERENCE TO RELATED APPLICATIONS

This application is a continuation of application Ser. No. 15/866,457, filed on Jan. 9, 2018, entitled "Ground Terminals via Remote Digital-Beam-Forming Networks for Satellites in Non-Geostationary Orbit", which is a continuation-in-part of application Ser. No. 14/993,442, filed on Jan. 12, 2016, entitled "Wavefront Multiplexing in Passive Optical Network with Remote Digital Beam Forming", which claims benefit of provisional application No. 62247907, filed on Oct. 29, 2015. This application is related to
1. U.S. Pat. Appl. Pub. No. 20130223840, "Resource Allocation in PON Networks via Wave-front Multiplexing and De-multiplexing," published on Aug. 29, 2013,
2. U.S. Pat. No. 8,111,646, "Communication System For Dynamically Combining Power From A Plurality Of Propagation Channels In Order To Improve Power Levels Of Transmitted Signals Without Affecting Receiver And Propagation Segment," issued on Feb. 7, 2012.
3. U.S. Pat. No. 8,098,612, "Apparatus And The Method For Remote Beam Forming For Satellite Broadcasting Systems," issued on Jan. 17, 2012.
4. U.S. Pat. Appl. Pub. No. 20110197740, "Novel Karaoke and Multi-Channel Data Recording/Transmission Techniques via Wavefront Multiplexing and Demultiplexing," published on Aug. 18, 2011.
5. U.S. Pat. Appl. Pub. No. 20140081989; "Wavefront Muxing and Demuxing for Cloud Data Storage and Transport," published on Mar. 20, 2014.

All of the above are incorporated herein by reference in their entireties.

BACKGROUND

1. Field of the Disclosure

Four independent technologies are incorporated in this invention to efficiently and cost effectively implement dynamic last mile connectivity. The four technologies are passive optical networks (PON), small cell, wavefront multiplexing (or K-muxing), and digital beam forming (DBF). We have filed US patents for communications architectures featuring K-muxing overlaid over low cost of PON. Those inventions relate particularly to resource allocation in passive optical networks (PON) via wavefront multiplexing (WF-muxing or K-muxing) and wavefront demultiplexing (WF-demuxing or K-demuxing). The "WF-muxing in PON" can be configured for performing remote digital beam forming (RDBF) over a service area covered by multiple small cells. The RDBF may generate multiple shaped beams with enhanced connectivity and better isolations over a same frequency slot concurrently to serve multiple users over the coverage area.

2. Brief Description of the Related Art

Wavefront multiplexing/demultiplexing (WF muxing/demuxing) process embodies an architecture that utilizes multi-dimensional waveforms in various applications. Multiple data sets are preprocessed by WF muxing before stored/transported. WF muxed data is aggregated data from multiple data sets that have been "customized/processed" and disassembled into any scalable number of sets of processed data, with each set being stored on a storage site or being transported via a propagation channel. The original data is reassembled via WF demuxing after retrieving a lesser but scalable number of WF muxed data sets. The WF muxing/demuxing solution enhances data security and data redundancy in some applications, and facilitates dynamic resource (power and bandwidth, etc.) in others. In addition, WF muxing/demuxing methods enable a monitoring capability on the integrity of stored/transported waveforms.

K-space is a well understood term in solid state physics and imaging processing. The k-space can refer to:
a. Another name for the frequency domain but referring to a spatial rather than temporal frequency
b. Reciprocal space for the Fourier transform of a spatial function
c. Momentum space for the vector space of possible values of momentum for a particle
d. According to Wikipedia (Septemeber 2015), the k-space in magnetic resonance imaging (MRI)
   i. a formalism of k-space widely used in magnetic resonance imaging (MRI) introduced in 1979 by Likes and in 1983 by Ljunggren and Twieg.
   ii. In MRI physics, k-space is the 2D or 3D Fourier transform of the MR image measured.

We shall introduce the terms K-mux, Kmux, or KMx for representing the Wavefront multiplex; and K-muxing, Kmuxing, or KMxing for the Wavefront multiplexing. We may also use "K-Muxing in PON" for "WF-Muxing in PON", "K-muxer" for "WF muxer", and so on. In Electromagnetic (EM) theory, the letter K is often used to represent a directional vector and is a wave number in a propagation direction. The term ($\omega t - \underline{K} \cdot \underline{R}$) has been used extensively for propagation phase. $\underline{K}$ represents a directional (moving) surface and $\underline{R}$ a directional propagation displacement. Both are vectors. Therefore, a vector K is a "wavefront" mathematically. We will be using k-space as wavefront domain or wavefront space.

The present invention relates to methods and architectures for dynamic allocations of time slots or equivalent bandwidths of Passive Optical Networks (PON) via wavefront multiplexing (WF muxing or K-muxing) and wavefront de-multiplexing (WF-demuxing or K-demuxing) techniques to generate multi-dimensional waveforms propagating through existing time slots of PON network concurrently, enabling usage exceeding the bandwidth limits set by time slots or subchannels bandwidths for a subscriber. The architectures support dynamic bandwidth allocations as well as configurable bandwidth allocations. They also support dynamic "power resources" allocations as well as configurable power resources allocations of optical lasers to different signals of various subscribers.

It is also related to Digital beam forming (DBF) over a region for subscriber operation. Wireless network via the DBF shall optimize connectivity and minimize interference among multiple concurrent users. It may form a shaped beam, or multiple dynamic beams with orthogonal beam (OB) patterns. DBF can be implemented locally within the perimeter of a subscriber. It may also be implemented remotely via a remote beam forming (RBF) technique. DBF is a digital technique for implementing a beam-forming network (BFN). Similarly a remote beam-forming network (RBFN) may also be implemented digitally via remote DBF techniques.

Cellphone industry has responded to the increasing data transmission demands from smartphones, tablets, and similar devices by the introduction of 3G and 4G cellular networks. As demand continues to increase, it becomes increasingly difficult to satisfy this requirement, particularly in densely populated areas and remote rural areas. An essential component of the 4G strategy for satisfying demand is the use of picocells and femtocells. Together, these are classified as small cells. The term small cell is an umbrella term for low-powered radio access nodes that operate in licensed and unlicensed spectrum that have a range of 10 in to several hundred meters. Small cells now outnumber macro-cells and microcells combined, and the proportion of small cells in 4G networks is expected to rise.

A small cell is defined by a low-power, short range, self-contained base station. Initially used to describe consumer units intended for residential homes, the term has expanded to encompass higher capacity units for enterprise, rural and metropolitan areas. Key attributes include IP backhaul, self-optimization, low power consumption, and ease of deployment.

The small cell access point is a small base station, much like a Wi-Fi hot spot base station, placed in a residential, business, or public setting. It operates in the same frequency band and with the same protocols as an ordinary cellular network base station. Thus, a 4G smartphone or tablet can connect wirelessly with a 4G small cell with no change. The small cell connects to the Internet, typically over a DSL, fiber, or cable landline. Packetized traffic to and from the small cell connects to the cellular operator's core packet network via a small cell gateway.

There are several differences between picocells and femtocells. Typically, picocells cover a larger area than a femtocell and are installed and operated by the carrier. A femtocell on the other hand, is designed to be installed by the network customer. An example of the use of the femtocell is to provide coverage in the home or in a small office setting. Typically, a femtocell can serve only somewhere between 4 and 16 simultaneous users, whereas a picocell may be able to handle up to 100 users.

Small cells have been proposed as solutions for 5G, allowing frequency reuse efficiently but also moving the network complexity from base-stations to backbone network controls. PON can be used as the backhaul of small cell deployments.

According to the paper "Cost Optimization of Fiber Deployment for Small-cell Backhaul" by C. S. Ranaweera et al. in "Optical Fiber Communication Conference and Exposition and the National Fiber Optic Engineers Conference (OFC/NFOEC), 2013", many optimized PON deployments for various scenarios have been studied. However, cost-efficient deployments of PONs for small cell backhauling using existing infrastructure adds complexity because the existing resources must be taken into account. It has been shown in the paper, cost-efficient PON deployments using existing fiber resources for the purpose of small cell backhauling by determining the fiber routes, the best locations for splitters, and the most favorable number of PONs for a range of split ratios. For a test case, the resulting cost-optimized PON can save up to 56% of the deployment cost associated with small cell backhauling, in comparison to typical Ethernet based PTP fiber backhauling approaches.

In addition, DBF over multiple small cells via a remote digital beam forming (RDBN) network at a head-end of a PON will make frequency reuse more efficient than conventional optimizations of small cell radiations.

Remote beam forming (RBF) has been implemented in all TDRSS satellites in 1980s using FDM muxing among back-channels in feeder-links. Their RBF were implemented by analogue means. Remote digital beam forming (RDBF) was used in many mobile satellite systems (MSS) in early 2000s via techniques of ground base beam-forming (GBBF) using FDM muxing among back-channels in feeder-links. Most of the concerns and difficulties in implementation of RBF or RDBF are related to dynamic calibrations, and equalization of multiple channels in a feederlink, maintaining coherent operation among multiple array elements on board satellites.

A US patent with the U.S. Pat. No. 5,903,549 by Von der Embse et al. in 1999 proposed a CDM muxing scheme in feeder links for mobile satellite applications. Since CDM muxing covering entire bandwidth of feeder-links, variations on amplitude and phase delays over multiple CDM channels are minimum. Thus, dynamic calibration and equalizations among propagation channels in feederlink become less an issue.

In this patent application, we are proposing a K-muxing scheme, over a TDM in PON format, with capability for continuous and dynamic calibration and equalization among multiple backchannels in feeder-links for terrestrial wireless communication applications. The feeder-links for the PONs are the time slots via fibers. Thus, dynamic calibration and equalizations among propagation channels in feederlink may become an issue. Similar K-muxing scheme can be overlaid over FDM or CDM channels for many wireless communications applications; including those via satellites and via terrestrial hubs. They also are applicable to cable networks.

3. Background in PON

Most of the Fiber-to-the-Home deployments in recent years have been based on industry standard technologies such as Gigabit Ethernet Passive Optical Networks (GEPON) and Gigabit PON (GPON). Passive Optical Network (PON) is a point-to multipoint network. A PON consists of optical line terminal at the service provider's central office and many number of optical network units near end users. The goal of PON is to reduce the amount of fiber. There are two standards of the Passive Optical Network available, the GPON and the GEPON. GPON (Gigabit PON) is the evolution of broadband PON (BPON) standard. The protocols used by GPON are ATM, GEM, and Ethernet. It supports higher rates and has more security.

GEPON or EPON (Ethernet PON) is an IEEE standard that uses Ethernet for sending data packets. By 2010, there were over 15 million EPON ports installed. GEPON uses 1 gigabit per second upstream and downstream rates. EPON/GEPON is a fast Ethernet over passive optical networks which are point to multipoint to the premises (FTTP) or fiber to the home (FTTH) architecture in which single optical fiber is used to serve multiple premises or users.

The success of these deployments has led to significant innovation in both system architecture and the components that are used to build these systems, and the next generation of passive optical networks will inevitably be far more advanced than what is typically deployed today.

Traditional PON architectures feature one optical feed shared among 32 or more users, as depicted in FIG. 1. In a GPON or GEPON system all subscribers use a common optical wavelength. They share the fiber infrastructure, which is done through time division multiplexing (TDM). Each of those 32 homes transmits over the same fiber, but the time in which they are allowed to "occupy" the fiber is allocated by the Optical Line Terminal (OLT) at the central office. While the equipment in each home is capable of transmitting at over 1,250 Mbps, it can only do so during its allotted time on the fiber, and therefore it is not uncommon for each subscriber in a legacy PON system to only achieve sustained data rates of around 30 Mbps. This concept of many users sharing a common fiber helps minimize the fiber infrastructure required in an FTTH deployment.

An Optical Line Terminal (OLT) provides a direct optical interface to the Ethernet/IP network core. Together with Optical Network Unit (ONU), it completes the end-to-end optical last mile with up to 1 Gbps of bandwidth to residential and business customers.

An OLT may consist of 4 PON cards, each card with 2 PON links, total up to 8 PON links. Each PON link delivers 1 Gbps of shared bandwidth between up to 32 subscribers within 20 Km reach. An OLT may serve a maximum of 256 subscribers from a 19" 2RU chassis. With layer 2 switching capability, OLT has up to 8 optical or electrical gigabit uplink ports.

According to Wikipedia, there are also many variations in PONs. Five of the variations are listed below.

1. TDM-PON
   APON/BPON, EPON and GPON have been widely deployed. By 2015, EPON has approximately 40 million deployed ports and ranks first in deployments. GPON growth has been steady, but fewer than 2 million installed ports.

For TDM-PON, a passive optical splitter is used in the optical distribution network. In the upstream direction, each ONU (optical network units) or ONT (optical network terminal) burst transmits for an assigned timeslot (multiplexed in the time domain). In the downstream direction, the OLT (usually) continuously transmits (or may burst transmit).

2. DOCSIS Provisioning of EPON or DPoE
   Data over Cable Service Interface Specification (DOCSIS) Provisioning of Ethernet Passive Optical Network, or DPoE, is a set of Cable Television Laboratory specifications that implement the DOC SIS service layer interface on existing Ethernet PON (EPON, GEPON or 10G-EPON) Media Access Control (MAC) and Physical layer (PHY) standards.

It makes the EPON OLT look and act like a DOCSIS Cable Modem Termination Systems (CMTS) platform (which is called a DPoE System in DPoE terminology).

3. Radio frequency over glass
   Radio frequency over glass (RFoG) is a type of passive optical network that transports radio frequency (RF) signals that were formerly transported over copper (principally over a hybrid fibre-coaxial cable) over PON.

RFoG offers backwards compatibility with existing RF modulation technology, but offers no additional bandwidth for RF based services.

Although not yet completed, the RFoG standard is actually a collection of standardized options which are not compatible with each other (they cannot be mixed on the same PON). Some of the standards may interoperate with other PONs, others may not.

4. WDM-PON
   Wavelength Division Multiplexing PON, or WDM-PON, is a non-standard type of passive optical networking, being developed by some companies.

The multiple wavelengths of a WDM-PON can be used to separate Optical Network Units (ONUs) into several virtual PONs co-existing on the same physical infrastructure.

There is no common standard for WDM-PON nor any unanimously agreed upon definition of the term.

5. Long-Reach Optical Access Networks
   The concept of the Long-Reach Optical Access Network (LROAN) is to replace the optical/electrical/optical conversion that takes place at the local exchange with a continuous optical path that extends from the customer to the core of the network.

In this application, we will present examples using TDM PON for implementing incoherent K-muxing on information digital data sets, and RFoG for examples using coherent K-muxing on waveform or signal digital data set. In transmit, an information digital data set is converted into a waveform or signal digital data set through modulators. Similarly, a set of received waveform or signal digital data may also be converted to a set of received information data via demodulators.

In short, K-muxing for incoherent operation in data transport and storage are for enhancing data privacy via a superposition formatting on data and improved survivability via data redundancy. On the other hand, K-muxing for coherent operation in signal transmission via multiple channels are for coherent power combining to achieve enhanced signal-to-noise ratio (SNR) in a receiver, and dynamical resource allocations for communications applications. The resources include both power and bandwidth.

SUMMARY

The present invention relates to orthogonal modes propagations in a multi-dimensional communications channel via multi-dimensional waveforms. The architecture will enable operator to allocate existing asset (e.g. bandwidth) to various subscribers dynamically. It also relates to Passive Optical Networks (PON), Small cell, Wavefront Multiplexing or K-muxing, and Digital Beam Forming (DBF) and Remote Digital Beam Forming (RDBF). The K-muxing may be implemented to function in incoherent modes to enhance privacy and survivability in data transport. The same K-muxing may also be implemented for operations in coherent modes for power combining and resource allocations.

However, this sharing of fiber is one of the main factors limiting higher data rates to subscribers. Wavefront multiplexing (WF muxing) techniques shown in FIG. 3 allow the same fiber infrastructure to be used more effectively, while enabling a subscriber to dynamically access the PON network faster with re-configurable high data rate, up to the full 1,250 Mbps, available to them when needed. There are no requirements to replace existing infrastructures, but with additional pre- and post-processes at both OLT and ONTs.

The upgraded PONs can support (1) subscribers with different but fixed needs in data rates; (2) subscribers with different and dynamic needs in data rates; (3) subscribers with different needs in optical powers in a PON network, enhancing coverage quality of the PON network; (4) subscribers (ONTs) at longer distances from an OLT getting more shares of a (laser) power to boost their signals; and (5) subscribers (ONTs) at shorter distances from an OLT getting less shares of a (laser) power to boost their signals.

BRIEF DESCRIPTION OF THE DRAWINGS

The drawings disclose illustrative embodiments of the present disclosure. They do not set forth all embodiments.

Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Figure 1:
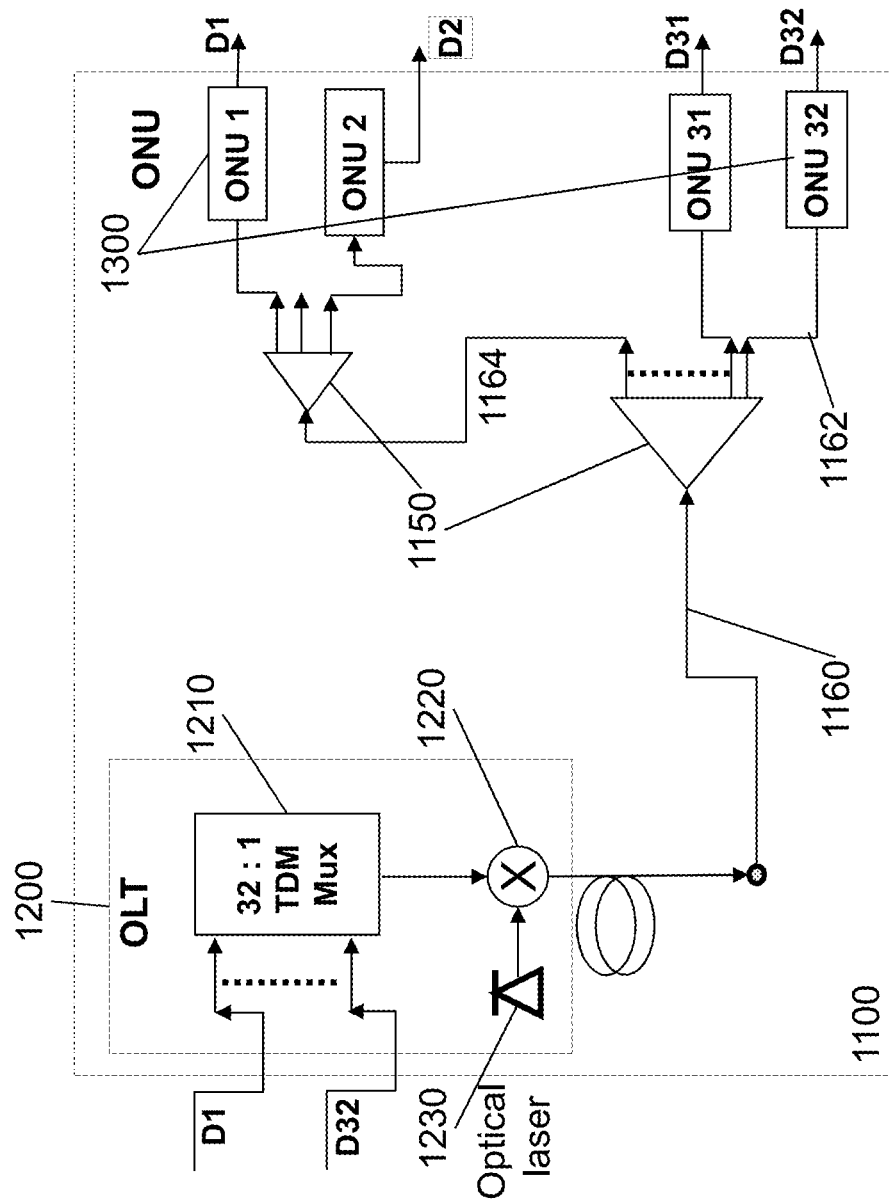

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 1 shows a data communication system via a PON in a forward direction according to an embodiment of the present disclosure.

Figure 1A:
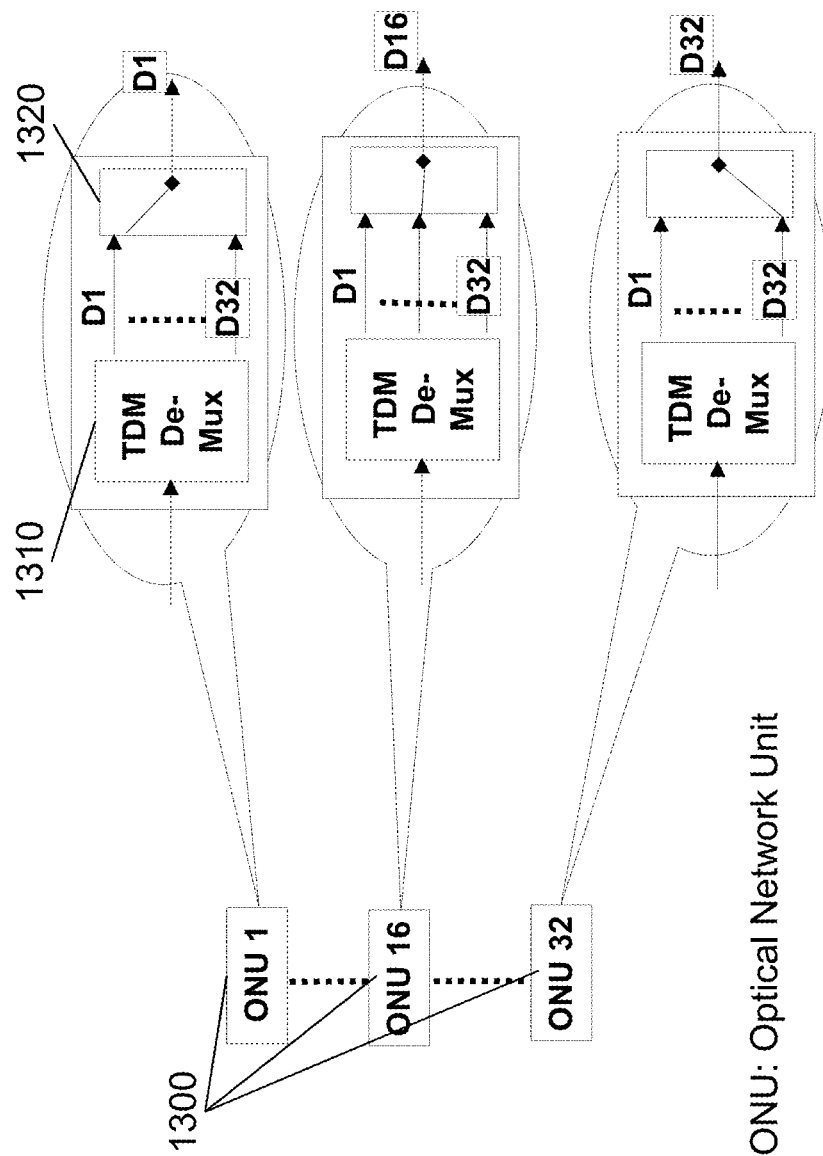

FIG. 1A shows functional blocks of ONUs in the data communication system in FIG. 1 according to embodiments of the present disclosure.

Figure 1B:
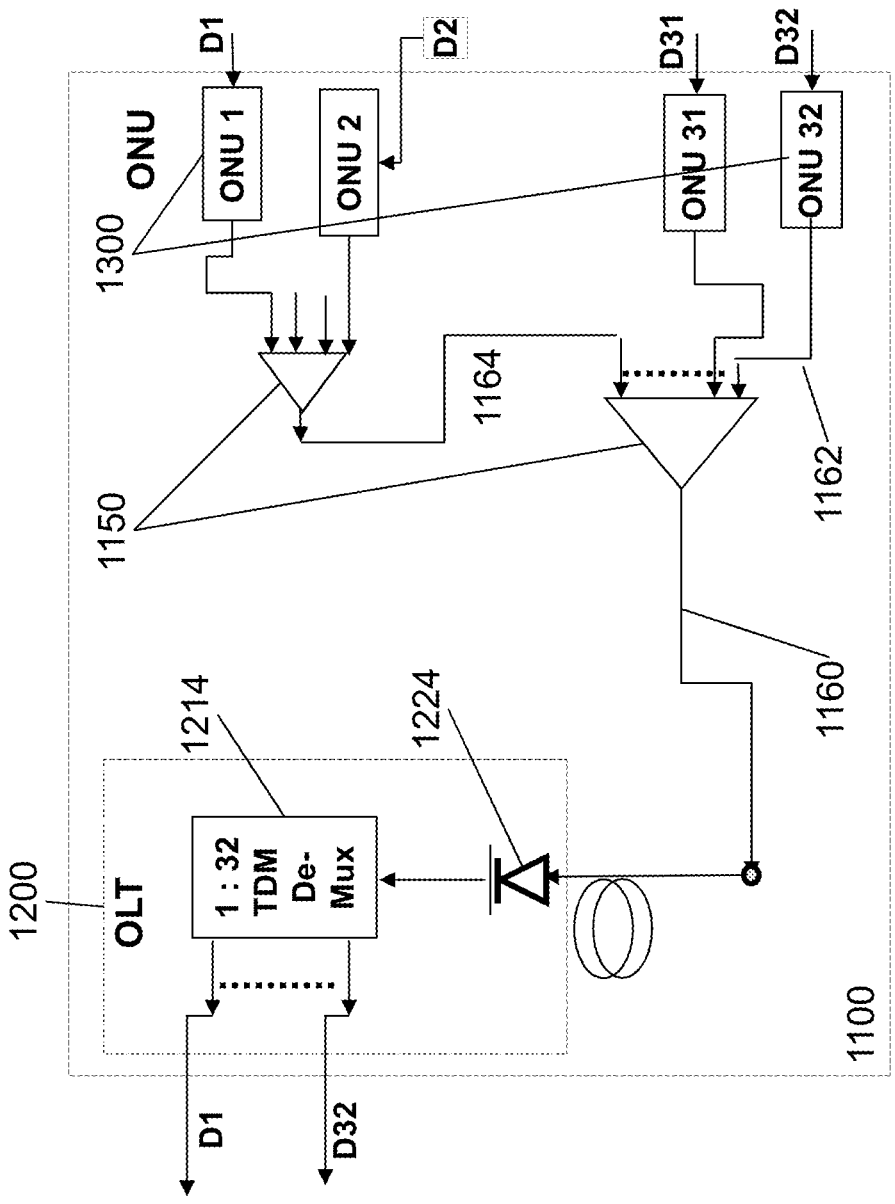

FIG. 1B shows a data communication system via a PON in a return direction according to an embodiment of the present disclosure.

Figure 2:
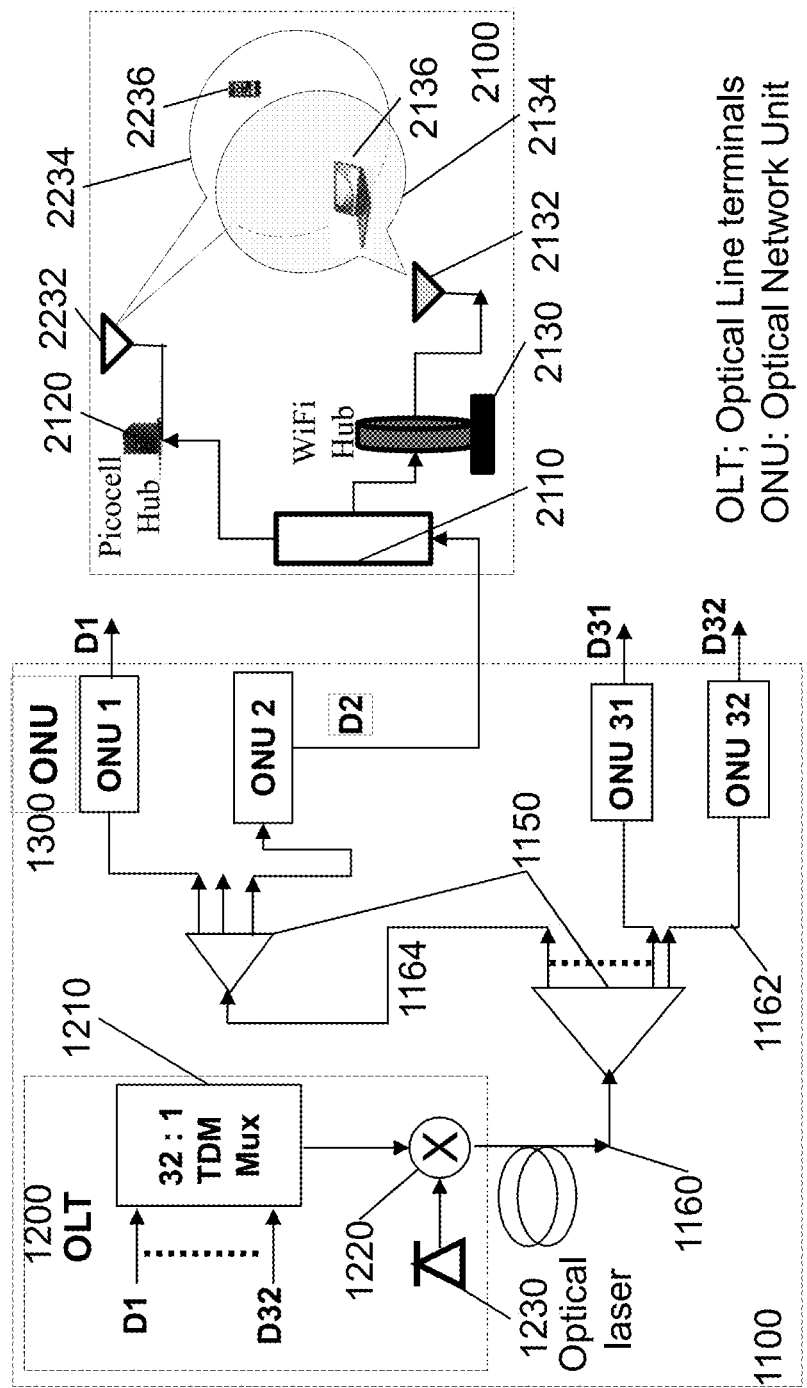

FIG. 2 shows a forward link architecture of a PON connected to a small-cell hub (or Picocell hub) and a WI-FI hub according to embodiments of the present disclosure.

Figure 3:
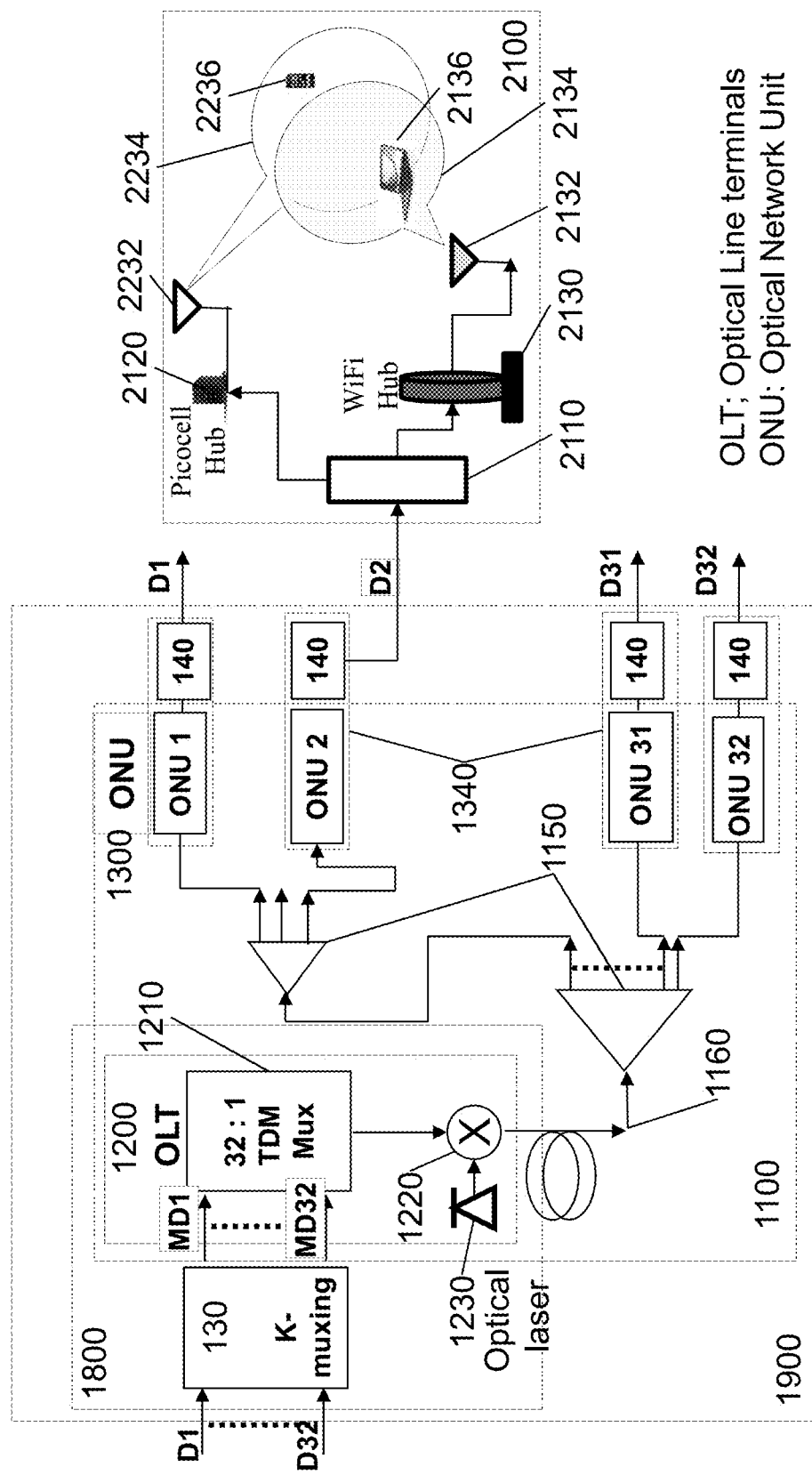

FIG. 3 shows a K-muxing forward link architecture over a data communication system via PON connected to a small-cell hub (or Picocell hub) and a WI-FI hub according to embodiments of the present disclosure.

Figure 3A:
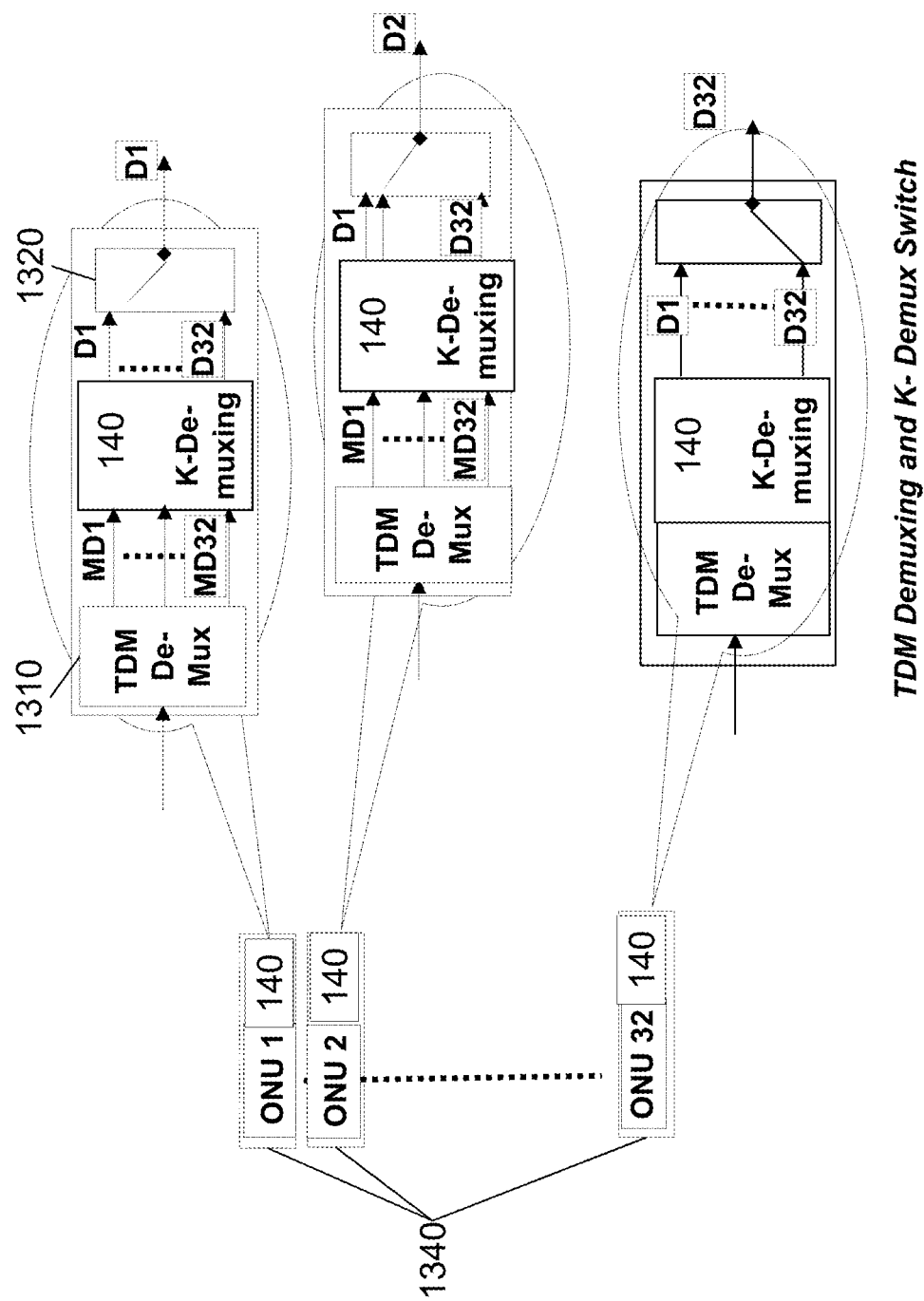

FIG. 3A shows functional blocks of ONUs in the data communication system in FIG. 3 including the functions of K-demuxing according to an embodiment of the present disclosure.

Figure 3B:
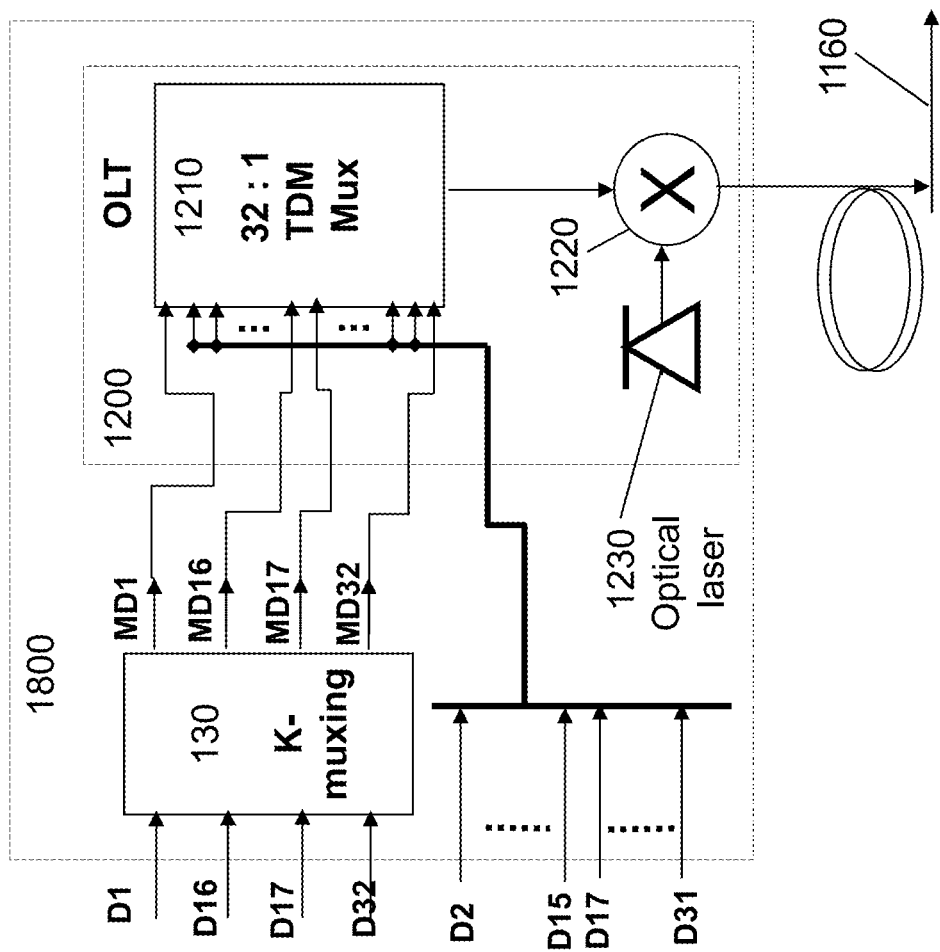

FIG. 3B shows a configuration of a pre-processing including a K-muxing in forward link over a data communication system via PON according to embodiments of the present disclosure.

FIG. 3C shows configurations of a 4-to-4 K-muxing in forward link via PON according to embodiments of the present disclosure.

Figure 3D:
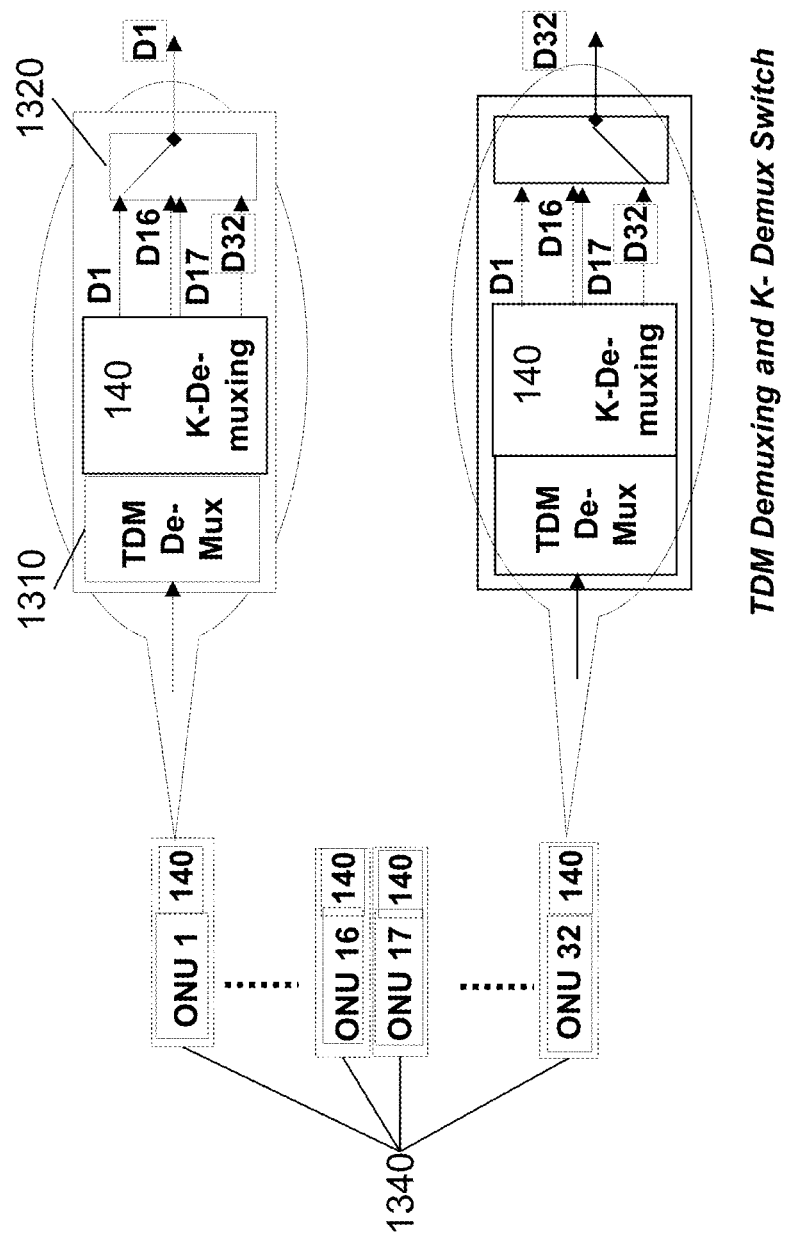

FIG. 3D shows configurations of updated ONUs including 4-to-4 K-demuxing in forward link via PON according to embodiments of the present disclosure.

Figure 3E:
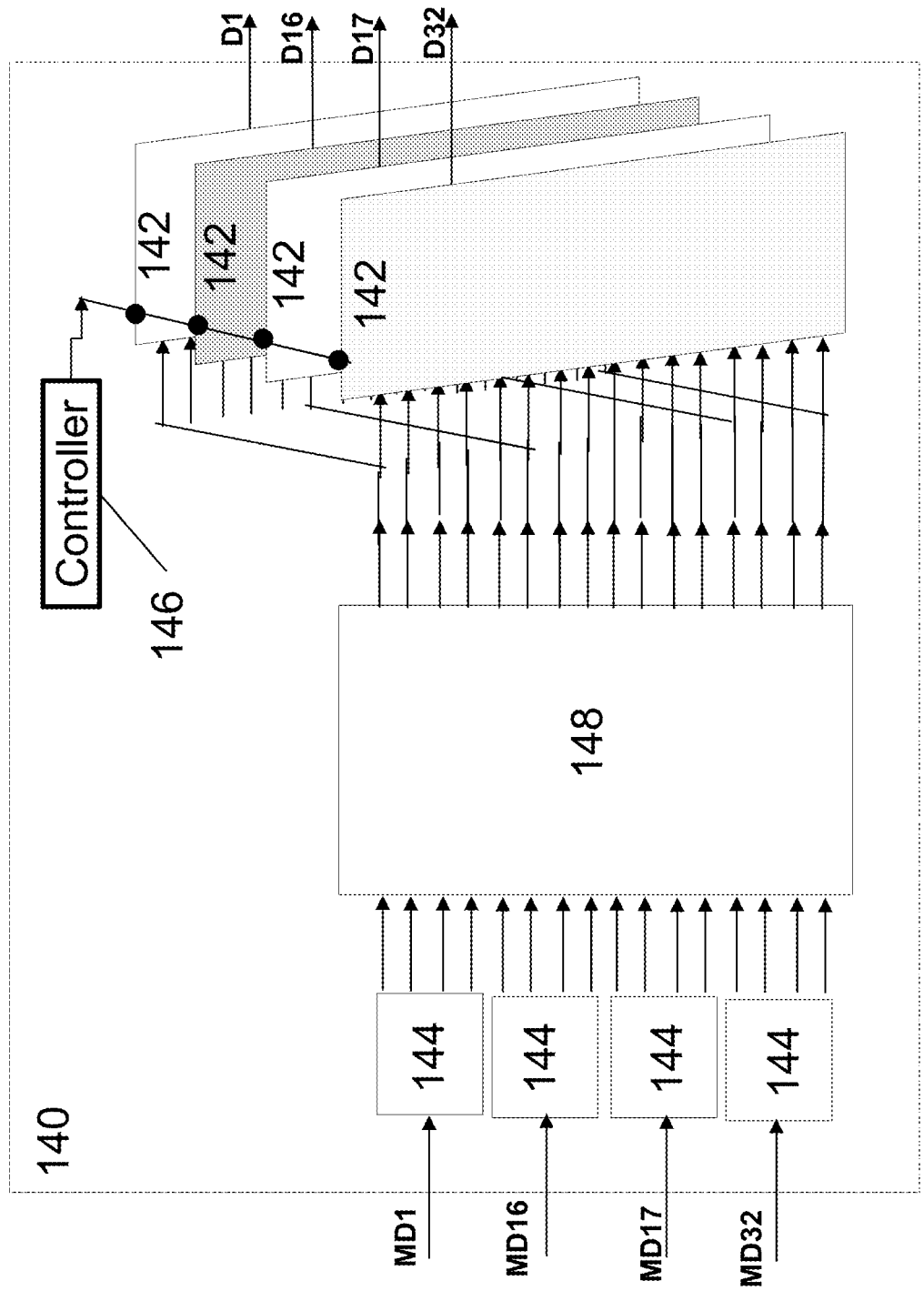

FIG. 3E shows configurations of a 4-to-4 K-demuxing in forward link via PON according to embodiments of the present disclosure.

Figure 4:
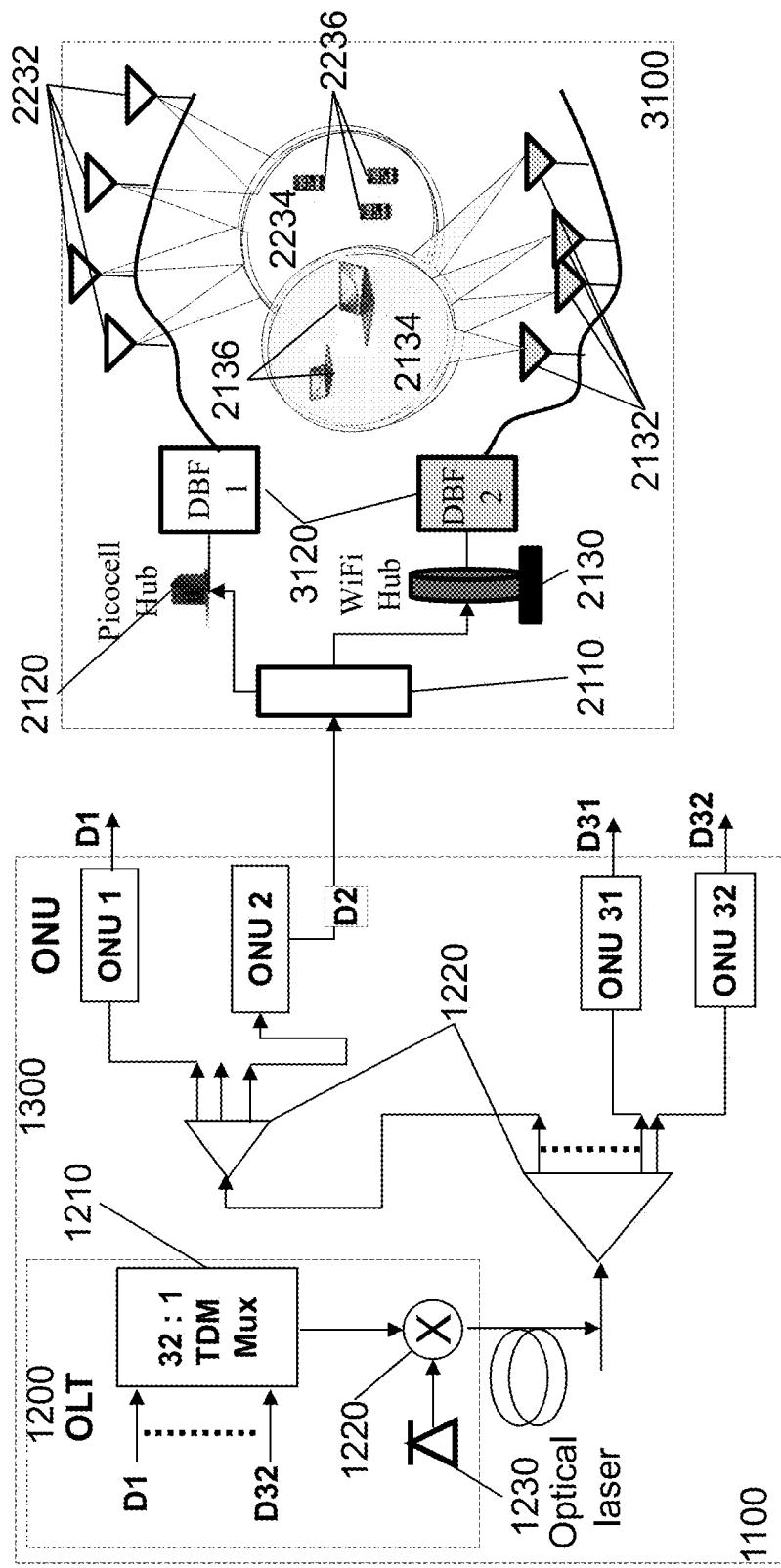

FIG. 4 shows an architecture of a PON connected to a small-cell hub (or Picocell hub) with a first digital beam forming (DBF) network and a WI-FI hub with a second DBF network according to embodiments of the present disclosure.

Figure 4A:
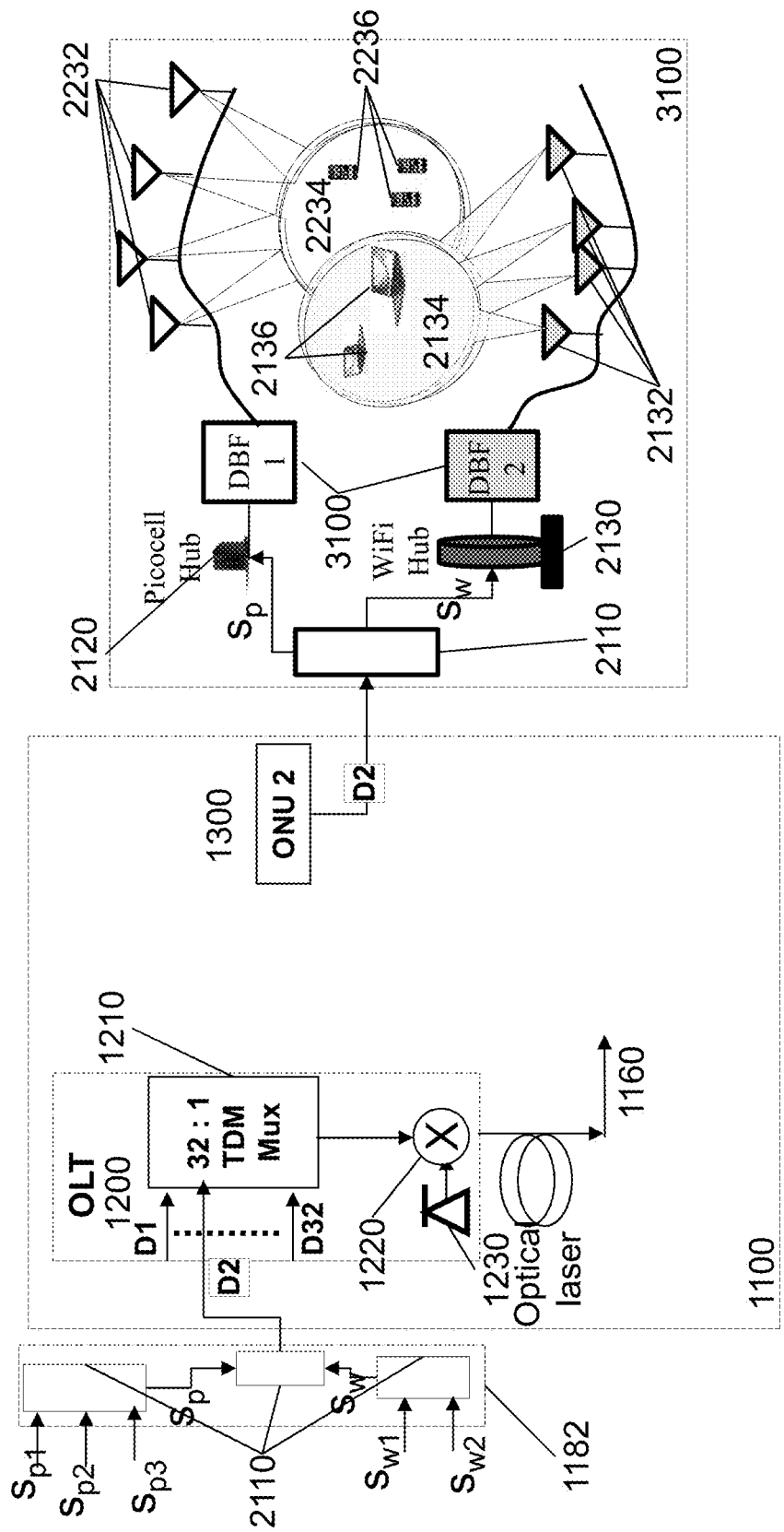

FIG. 4A shows forward direction routing networks for a user at headend of a PON connected to a small-cell hub (or Picocell hub) with a first digital beam forming (DBF) network and a WI-FI hub with a second DBF network according to embodiments of the present disclosure.

Figure 5:
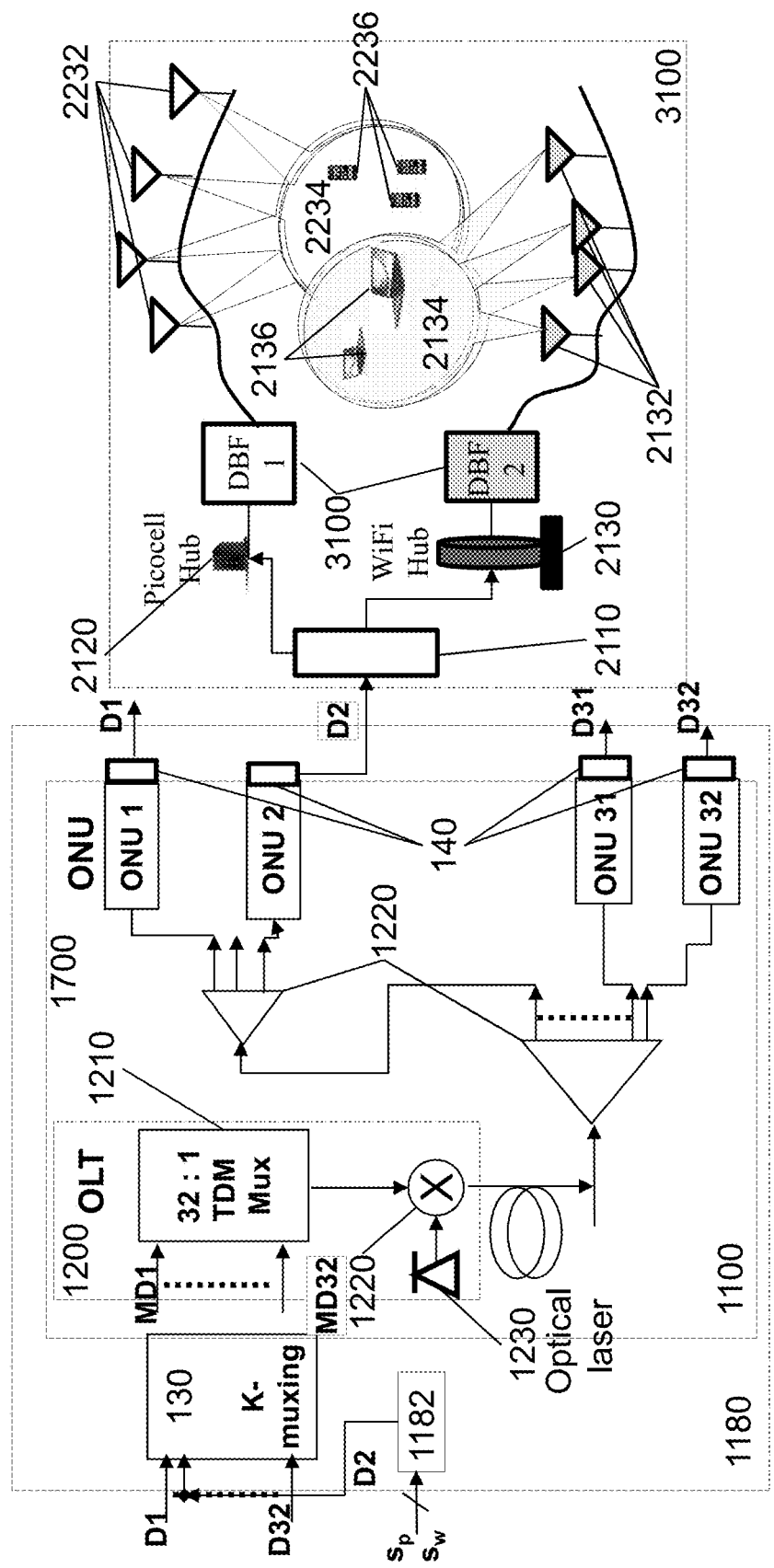

FIG. 5 shows a K-muxing architecture over a data communication system via PON connected to a small-cell hub (or Picocell hub) with a first digital beam forming (DBF) network and a WI-FI hub with a second DBF network according to embodiments of the present disclosure.

Figure 5A:
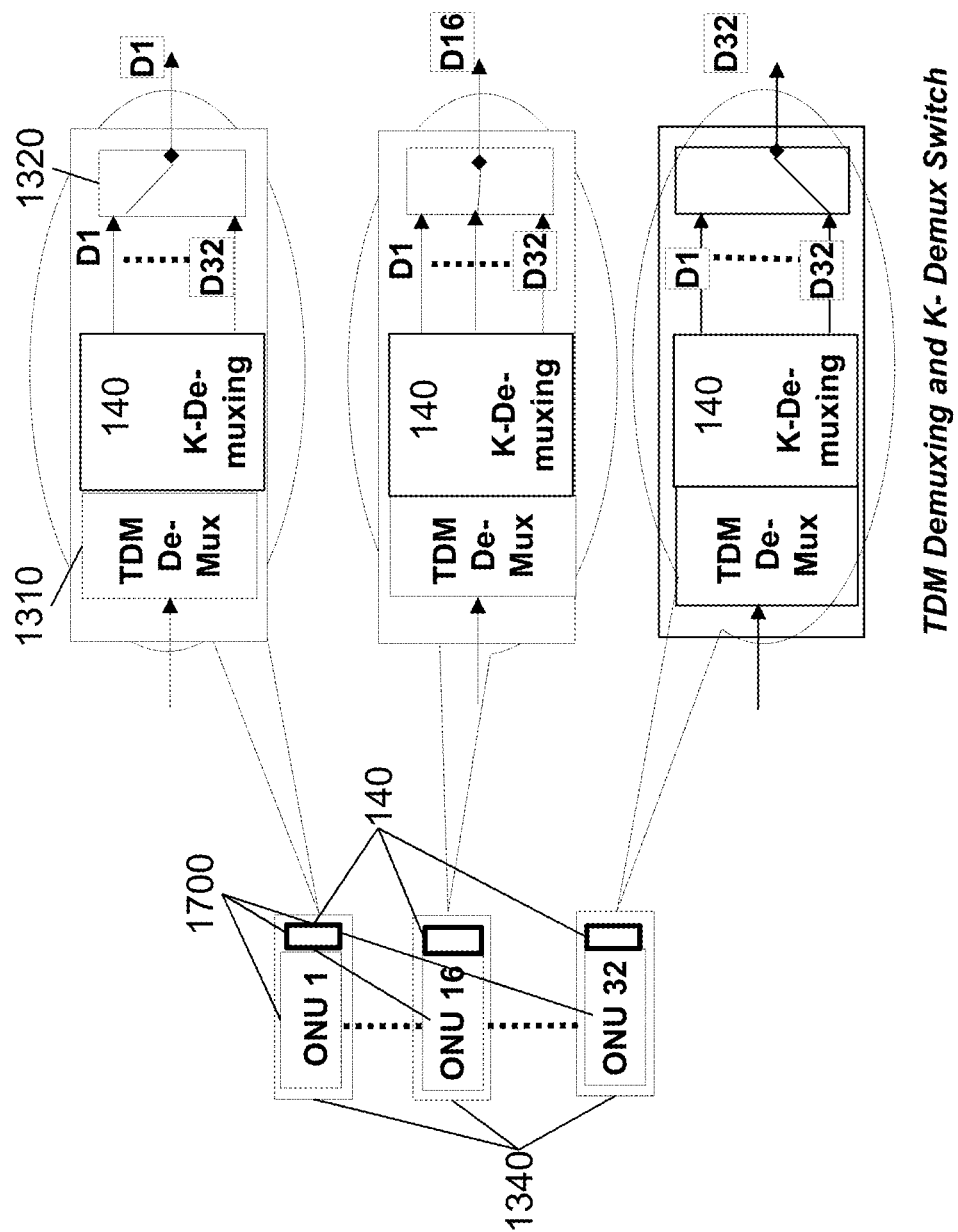

FIG. 5A show shows functional blocks of ONUs in the data communication system in FIG. 5 including the functions of K-demuxing according to an embodiment of the present disclosure.

Figure 6:
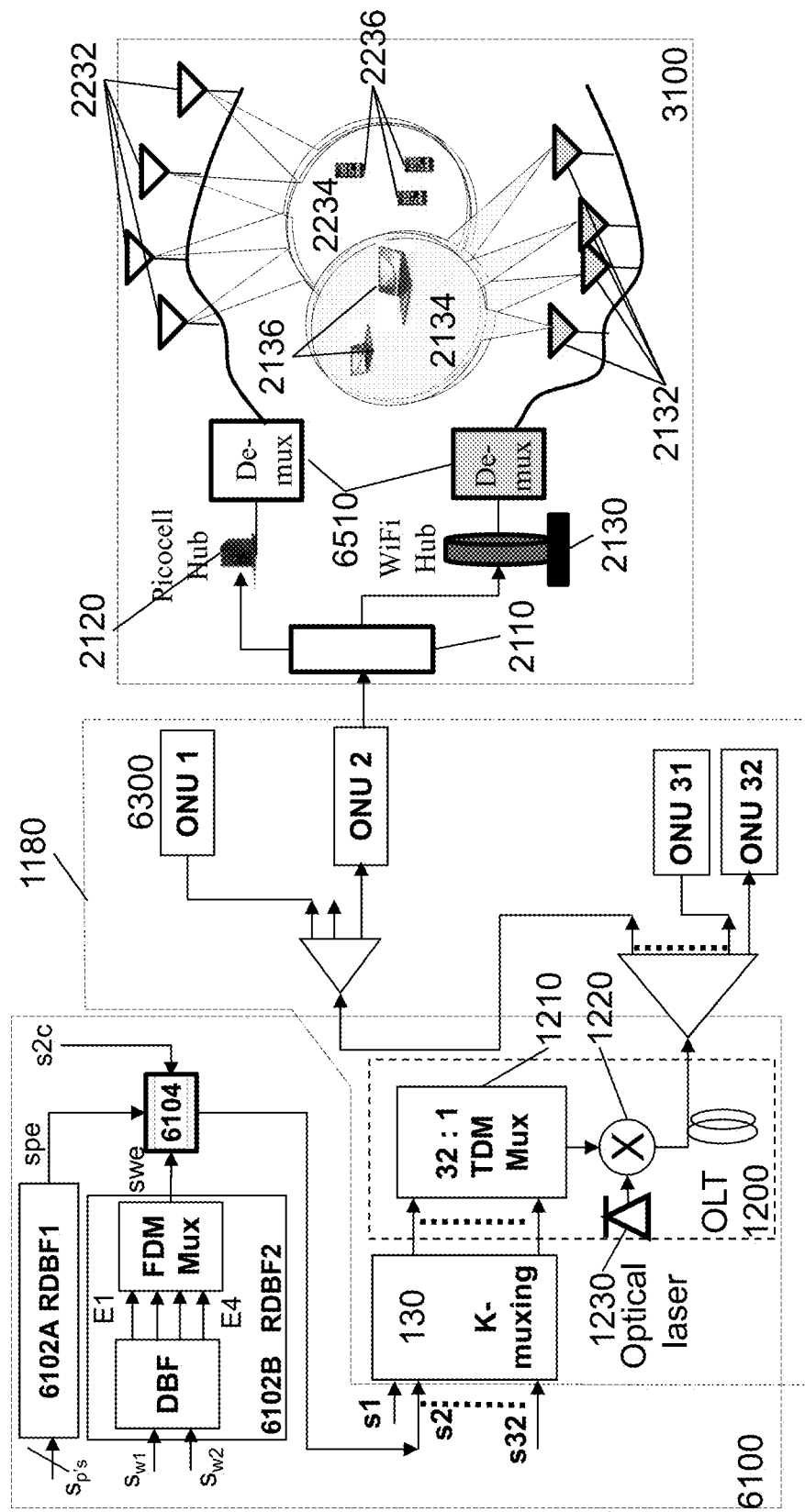

FIG. 6 shows a K-muxing architecture for a forward link over a signal communication system via a PON connected to a small-cell hub (or Picocell hub) and a WI-FI hub with remote digital beam forming (RDBF) networks according to embodiments of the present disclosure. The PON may operate in one of RFoG modes.

Figure 6A:
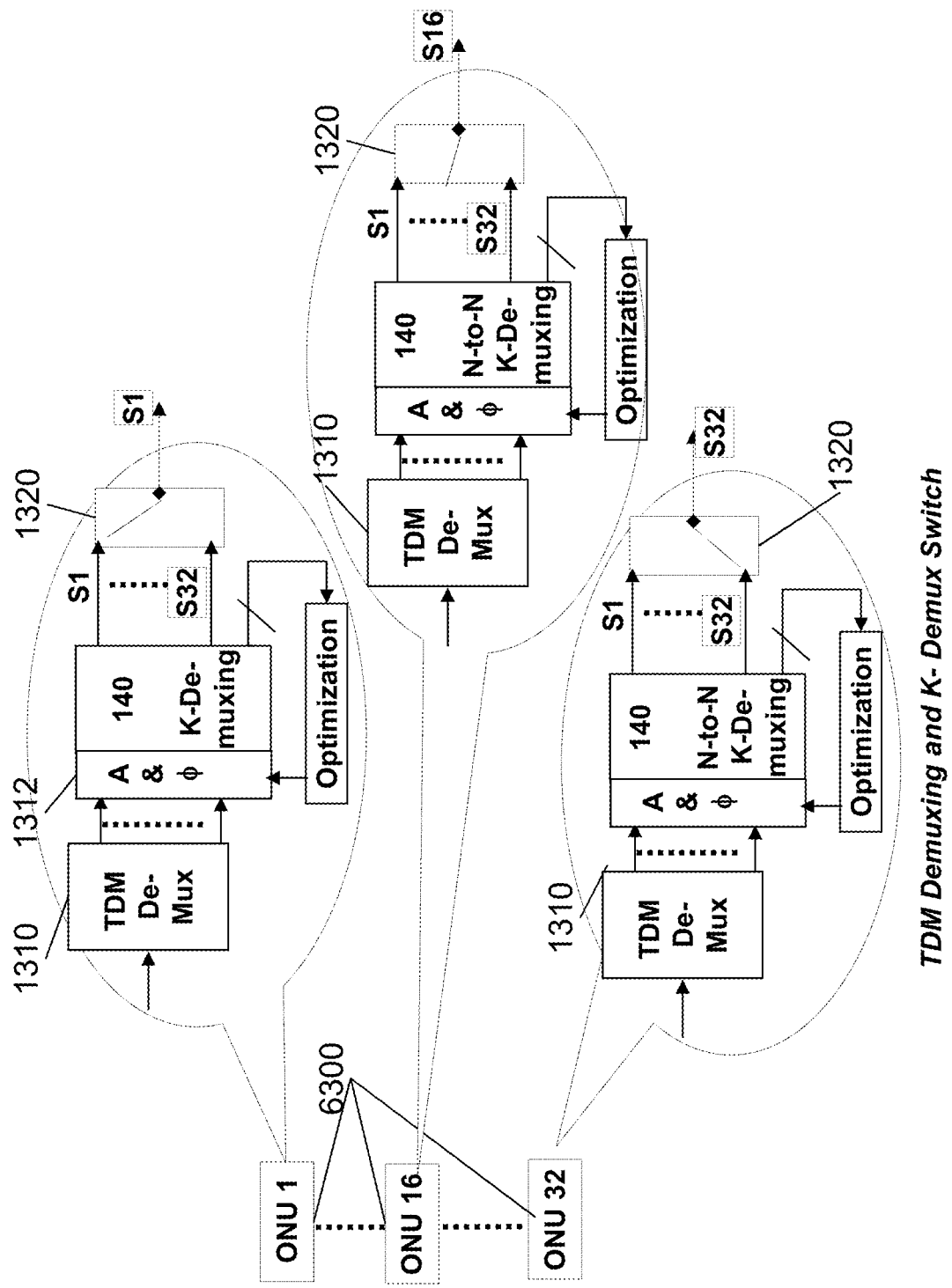

FIG. 6A shows functional blocks of ONUs including K-demuxing and optimization according to an embodiment of the present disclosure.

Figure 7:
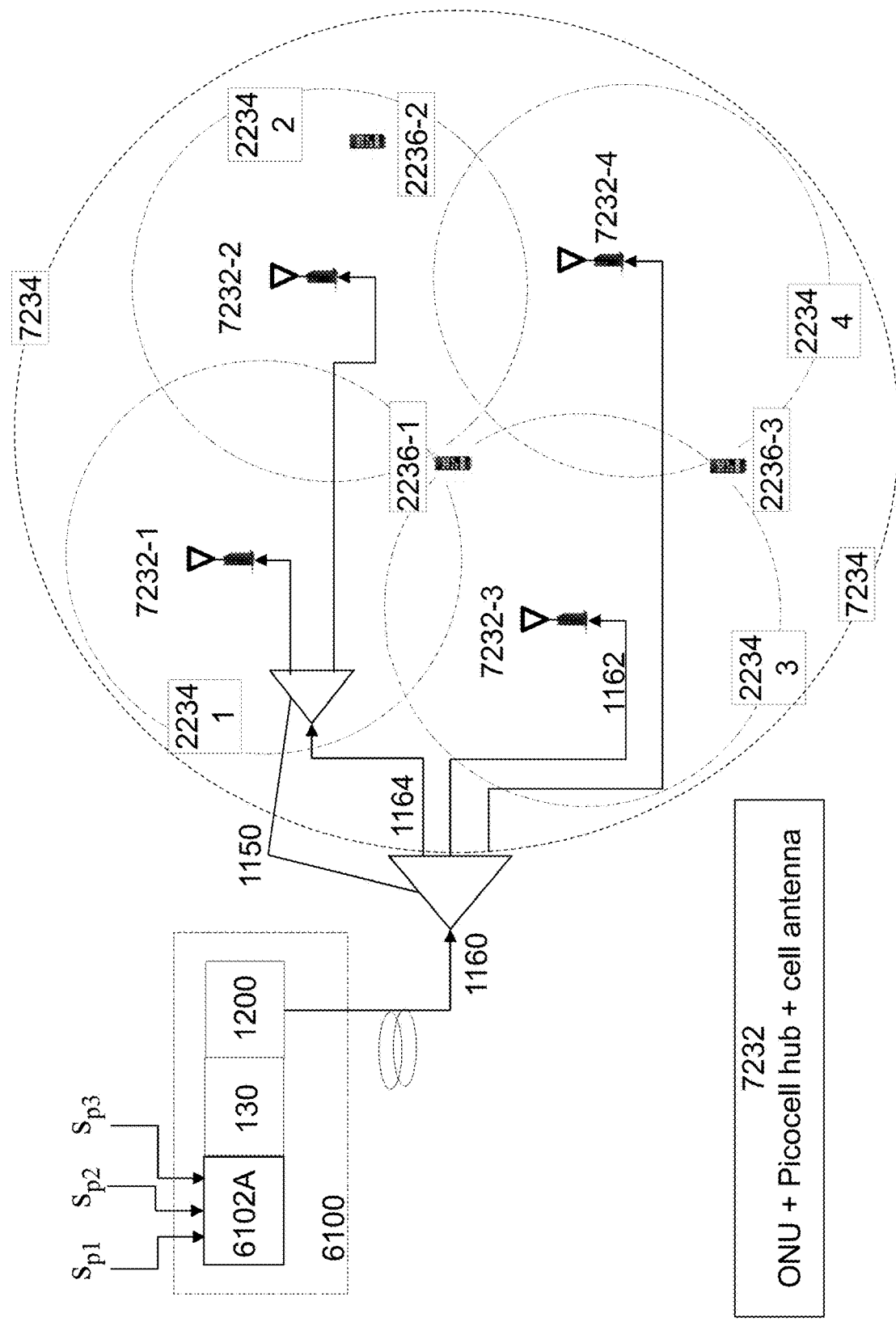

FIG. 7 shows a forward link architecture via a PON connected to multiple small-cell hub (or Picocell hub) to function as a multibeam array with remote digital beam forming (RDBF) networks according to embodiments of the present disclosure. The PON may operate in one of RFoG modes.

Figure 8:
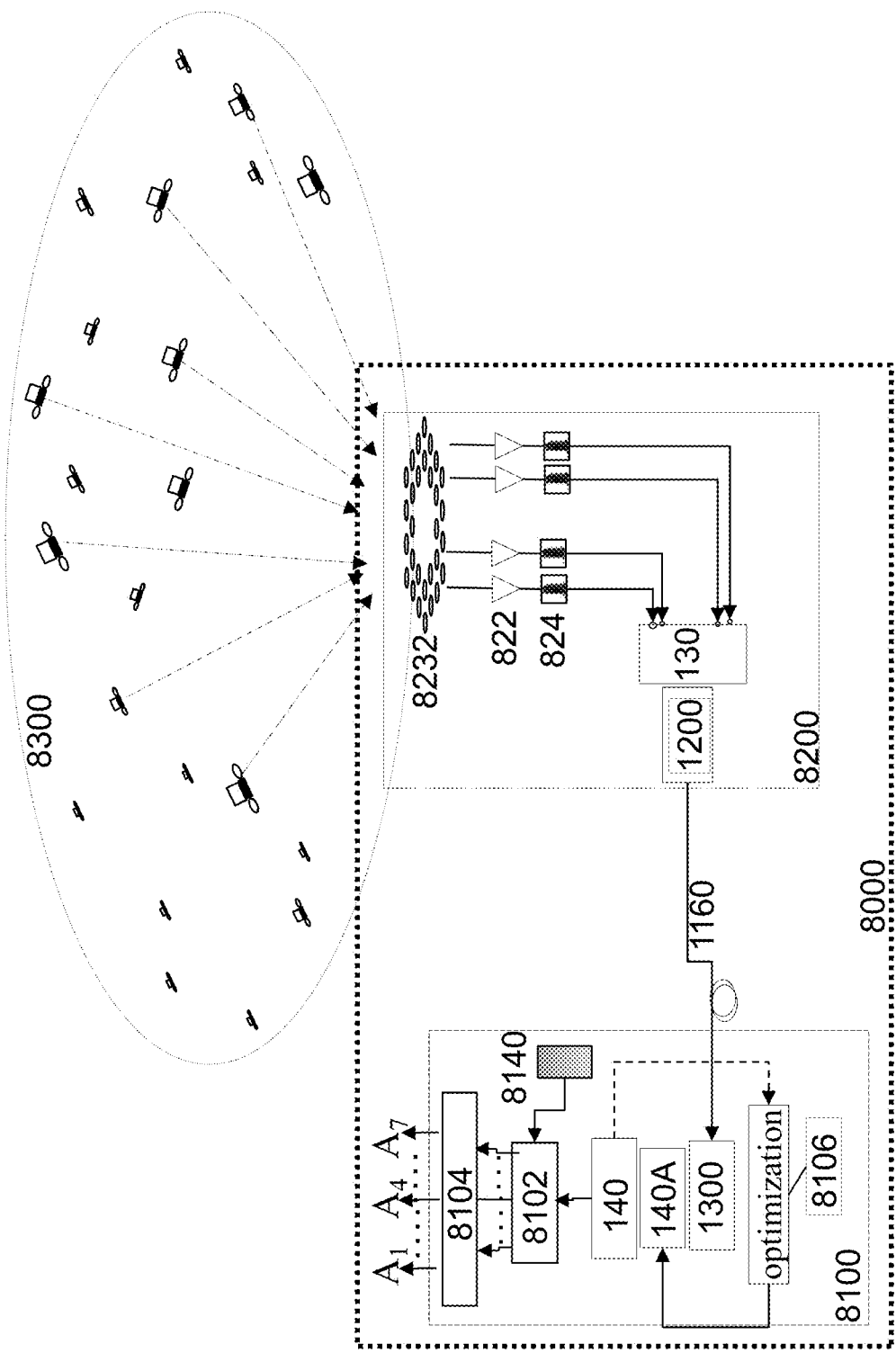

FIG. 8 shows a receiving (Rx) RDBF ground terminal via a PON for communications through satellite constellations in non-geostationary orbits (NGSO) according to embodiments of the present disclosure. The PON may operate in one of RFoG modes.

Figure 9:
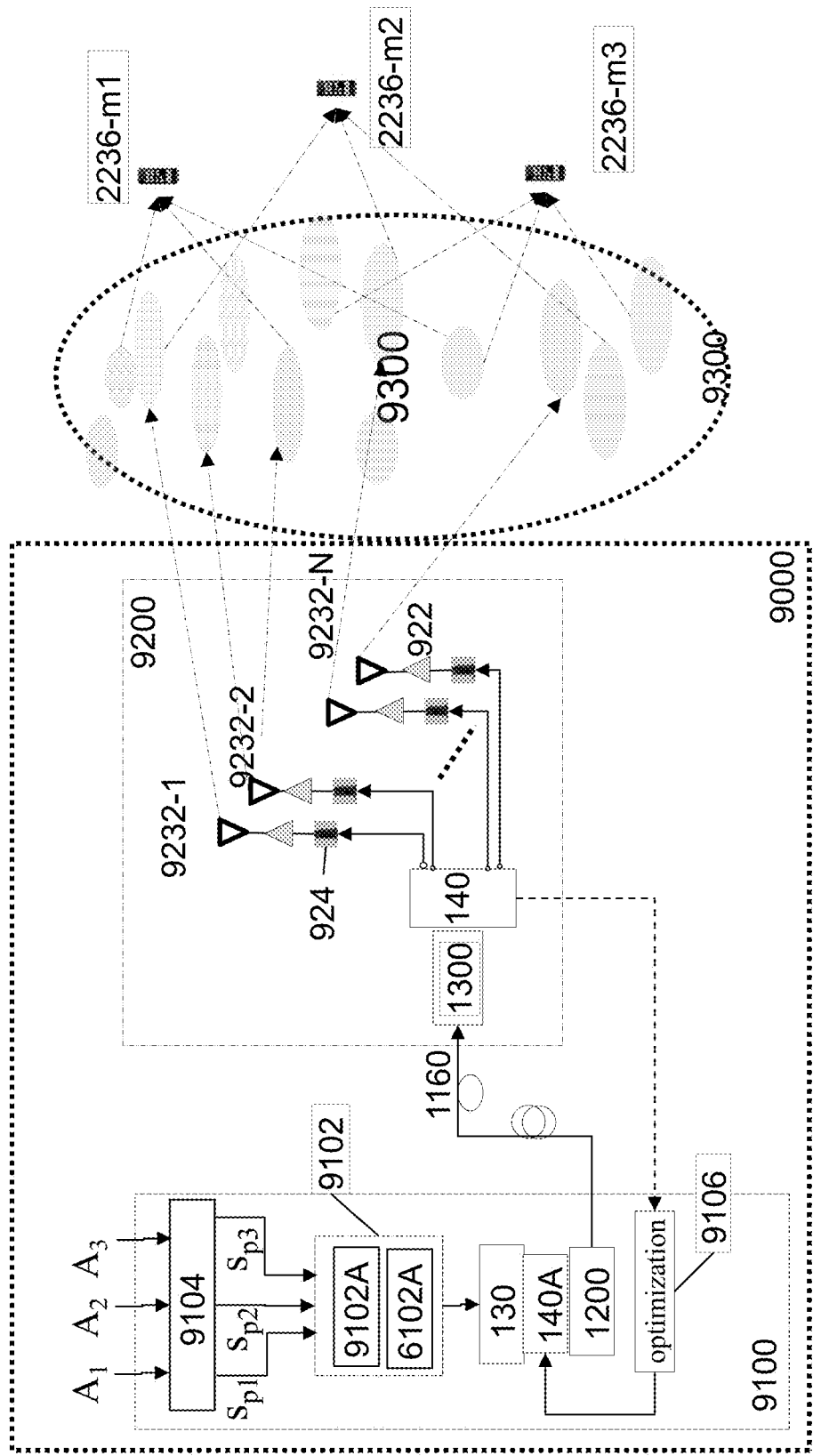

FIG. 9 shows a MIMO basestation in transmitting (Tx) modes with RDBF via a PON according to embodiments of the present disclosure. The PON may operate in one of RFoG modes.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed.

Before describing embodiments of the present invention, a definition has been included for these various terms. These definitions are provided to assist in teaching a general understanding of the present invention.

All figures illustrate forward direction implementations and key functions. Most of return direction implementations and key functions are similar and not shown.

For conventional TDM-PON, a passive optical splitter is used in the optical distribution network. In the upstream or return direction, each ONU (optical network units) or ONT (optical network terminal) burst transmits for an assigned time-slot (multiplexed in the time domain). In this way, the OLT is receiving signals from only one ONU or ONT at any point in time. For K-muxing over a TDM PON, each ONU (optical network units) or ONT (optical network terminal) in the upstream or return direction continuously transmits K-muxed signals with unique WF vectors at low power level for all time-slots (multiplexed in the time domain).

Structure of Passive Optical Network (PON):

FIG. 1 is a forward link schematic diagram showing a passive optical network (PON) for multiple user processors according to an embodiment of the present invention. The passive optical network 1100 includes an optical line terminal 1200 (OLT), optical transferring devices or optical dividers 1150, the number n of optical network units 1300 (ONUs), and multiple optical fibers 1160, 1162 and 1164, wherein the number n may be a positive integer greater than 2, such as 4, 8 or 12. The optical fiber 1160 connects the optical line terminal 1200 (OLT) and the optical transferring devices or optical dividers 1150 and each of the optical fibers 1162 connects the optical dividers 1150 and a corresponding one of the optical network units 1300 (ONUs). The optical fibers 1164 are used for interconnecting the optical dividers 1150.

An OLT 1200 further comprises three major function: a conventional multiplexing, an optical modulating or frequency converting, and an optical source. Referring to FIG. 1 for a downstream operation, the depicted OLT 1200 for a TDM PON comprises a function of 32-to-1 TDM muxing 1210, and a function of optical modulating 1220. The function for the 32-to-1 TDM muxing 1210 converts 32 lower speed data streams (D1, D2 . . . D32) into one TDM muxed output stream with high flow rate. The TDM muxed output shall feature digital symbols as a bit stream with two levels representing "1" or "zero" only. They are information data to be used in the function of optical modulating 1220 as the direct modulating input. The second input for the optical modulating 1220 is an optical laser 1230 serving as the optical carrier source for an optical modulator with the optical modulating function. The optical modulator with functions of the optical modulating 1220 converts a bit stream of information data to a stream of optical waveform stream which is sent to the rest of the PON.

The purpose for the PON depicted is to deliver D1 data stream to a first user with a first of 32 ONUs 1300, ONU 1; to deliver D2 data stream to a second user with ONU 2, and so on. The total throughput of the PON 1100 will then be shared among the 32 users usually uniformly. For a total throughput capacity of 1 or 2.5 Gbps, each user shall get a maximum capacity of 31.25 or 78.125 Mbps, respectively.

Referring to FIG. 1, the optical dividers 1150 may serve as an optical coupler and an optical splitter. For example, in a downstream direction, the optical divider 1150 can serve as an optical splitter for splitting an input optical signal, passing from the optical line terminal 1200 and through the optical fiber 1160, into multiple output optical signals, some being sent to other optical dividers through the respective optical fibers 1164, and others passing to the respective optical network units 1300 through the respective optical fibers 1162, wherein data carried by each of the output optical signals are substantially equivalent to those carried by the input optical signal.

In an upstream direction (not indicated in FIG. 1), the optical dividers 1150 can serve as an optical coupler for combining optical signals, passing from the respective optical network units 1300 and through the respective optical fibers 1162 and other optical dividers 1150 via associated fibers 1164, into an optical signal, passing to the optical line terminal 1200 through the optical fiber 1160.

The optical line terminal 1200 (OLT) is arranged between a central office (CO) processor and the optical dividers 1150. In the downstream direction, the OLT 1200 can transform electronic data, output from the central office processor, into optical data sent to one of the optical dividers 1150 through the optical fiber 1160. The data bit streams, D1 to D32 are part of the electronic data, output from the central office processor.

In the upstream direction (not shown), the OLT 1200 shall transform optical data, output from the fiber 1160 into electronic data sent to the central office processor. The opposite end of the fiber 1160 is connected to one of the optical dividers 1150.

FIG. 1A depicts major functions of optical network units (ONUs) 1300. There are 3 ONUs: ONU 1 for a first user, ONU 16 for a $16^{th}$ user and ONU 32 for a $32^{nd}$ user. Each of the ONUs shall convert a muxed optical signal stream to a TDM muxed data bit stream (not shown). Each ONU performs additional data manipulation comprising of two functions: (1) TDM demuxing 1310 converting an incoming TDM muxed data stream to 32 individual data bit streams (D1, D2 . . . D32), and (2) a 32-to-1 switching 1320. As a result, the output from ONU 1 will be D1 digital bit stream. Those for ONU 16 and ONU 32 shall be the bit data streams D16 and D32, respectively. The above mentioned functions are features of a TDM demuxing switch.

FIG. 1B is a return link schematic diagram showing a passive optical network (PON) for multiple user processors according to an embodiment of the present invention. In the upstream direction (return link), each ONU burst-transmits for an assigned time-slot (multiplexed in the time domain). In this way, the OLT 1200 is receiving signals from only one of ONUs 1300 at any point in time.

The passive optical network 1100 includes an optical line terminal 1200 (OLT), optical transferring devices or optical dividers 1150, the number n of optical network units 1300 (ONUs), and multiple optical fibers 1160, 1162 and 1164, wherein the number n may be a positive integer greater than 2, such as 4, 8 or 12. The optical fiber 1160 connects the optical line terminal 1200 (OLT) and the optical transferring devices or optical dividers 1150 and each of the optical fibers 1162 connects the optical dividers 1150 and a corresponding one of the optical network units 1300 (ONUs). The optical fibers 1164 are used for interconnecting the optical dividers 1150.

Referring to FIG. 1B for an upstream operation, one of the depicted ONUs 1300, say ONU 2 for a TDM PON comprises a function of 32-to-1 TDM muxing (not shown) and a function of optical modulating (not shown). Both are, respectively, similar to the TDM muxing 1210 and the modulating 1220 of the OLT 1200 in FIG. 1. The function for the TDM muxing 1210 converts a lower speed data stream (D2) into one TDM burst output stream with high flow rate in an assigned time slot. Other users at return links shall burst their data streams in other respectively assigned time slots. The 32-to-1 TDM muxed output in the fiber segment 1160 just before the OLT shall feature digital symbols in optical signals or waveforms as a bit stream with two levels representing "1" or "zero" only. They are information data used in the function of optical modulating 1220 as the direct modulating input in ONUs. The second inputs for optical modulating 1220 are embedded optical lasers (not shown) serving as the optical carrier sources for optical modulators with the optical modulating functions. The optical modulators (not shown) with functions of the optical modulating 1220 convert bit streams of information data to a stream of optical waveform stream which is sent to the rest of the PON.

An OLT 1200 in receiving further comprises two major receiving function: an optical demodulating 1224 and a TDM demuxing 1214.

Embodiment 1

FIG. 2 depicts a PON 1100 connected to a user processor 2100 for a second user through one of the ONUs 1300, the ONU 2 designated as for a second user with a designated data bit stream D2. The user processor 2100 comprises a router 2110 which is connected to a picocell hub 2120 for cell phone wireless connectivity via a picocell hub antenna 2232. Cellphone 2236 can be operational within the antenna coverage or field-of-view (FOV) 2234. Picocell is also referred as small-cell. The router 2110 may also be connected to WiFi hub 2130 for wireless connectivity via a WiFi hub antenna 2132 for many personal devices 2136. A notebook as one of personal devices 2136 may connect to Internet when it is within the FOV 2134 of the WiFi hub antenna 2132.

Referring to FIG. 2, each of the optical network units 1300 (ONUs) is arranged between one of the optical dividers 1150 and a corresponding one of thirty-two user processors 2100. In the downstream direction, each of the optical network units 1300 can transform optical data, output from one of the optical dividers 1150, into electronic data sent to a corresponding one of the user processors 2100.

In the upstream direction (not shown), each of the optical network units ONUs 1300 can transform electronic data, output from a corresponding one of the user processors 2100, into optical data sent to one of the optical dividers 1150 through a corresponding one of the optical fibers 1162.

Embodiment 2

FIG. 3 is a down link or a forward direction schematic diagram showing a passive optical network (PON) 1100 in combination with wave-front multiplexing (K-muxing 130) and WF demultiplexing (K-demuxing 140) techniques for dynamically allocating the resource of the passive optical network system for multiple user processors 2100 according to an embodiment of the present invention. We shall refer to the K-muxing 130 in a preprocessor and K-demuxing 140 in post-processors. They are new functions in conjunction with a PON 1100 in this patent application. In short the K-muxing 130 before OLT 1200 in a pre-processor 1800 and the K-demuxing 140 after ONUs 1300 in post-processors 1340 in forward direction may be referred as new or additional functions for the OLT 1200 and the ONUs 1300. These new functions may be implemented by additional S/W and/or electronics boxes in the OLT and the ONUs. We referred this architecture, a PON in a combination of K-muxing 130 and K-demuxing 140, as "K-muxing in a PON" 1900.

The basic operation principles of "K-muxing in a PON" 1900 have been presented in U.S. Pat. Appl. Pub. No. 20130223840 "Resource Allocation in PON Networks via Wave-front Multiplexing and De-multiplexing," published on Aug. 29, 2013.

FIG. 3 is modified from FIG. 2. A WF muxing/demuxing or K-muxing/demuxing is overlaid on a conventional PON distribution to provide dynamic resource allocation capability. The PON for forward link is for 32 subscribers. A preprocessor with the K-muxing 130 will be implemented prior to a function of TDM muxing 1210 in OLT 1200. The function of K-muxing 130 may be implemented by an updated software in OLT. It illustrates that all of the 32 subscribers participate for a resource sharing program enabled by the functions of K-muxing 130 and K-demuxing 140. The set-up of a user processor 2100 for a second user are identical to the one in FIG. 2.

In the preprocessor 1800, the D1 data stream for a first subscriber is transformed to appear on all 32 outputs carried by all 32 time-slots in the PON 1100 with a unique weighting vector, called wavefront vector 1 or WFV1. So are the remaining 31 down-stream data D2 to D32. More precisely, the 32 substreams (D1 to D32) of data samples after a K-muxing 130 can be expressed as $$MD1 = w_{1,1}*D1 + w_{1,2}*D2 + \ldots + w_{1,32}*D32 \quad (1\text{-}1)$$

$$MD2 = w_{2,1}*D1 + w_{2,2}*D2 + \ldots + w_{2,32}*D32 \quad (1\text{-}2)$$

$$MD32 = w_{32,1}*D1 + w_{32,2}*D2 + \ldots + w_{32,32}*D32 \quad (1\text{-}32)$$

And equations (1-1) to (1-32) can be written in a matrix form;

$$[MD] = [W][D] \quad (2)$$

Furthermore, the column vector $[w_{1,1}, w_{2,1}, w_{3,1}, \ldots, w_{32,1}]^T$ is the wavefront vector 1 or WFV1, which "carrys" D1 data stream through the 32 TDM channels through a fiber 1160. So are the remaining 31 wavefront vectors for the 31 remaining down-stream data. We may state that D2 data stream is sent to a destination via a second wavefront WFV2 propagating in a fiber network with 32 channels, and that D32 is riding on WFV32.

We shall note that the output of the TDM mux 1210 will convert a sequential stream of digital samples into a high speed serial bit stream so that the optical modulator 1220 shall convert the electrical bit symbols of 0's and 1's to optical signals with two intensity levels of lasers in fibers.

At destinations, the ONUs will convert the optical signals of TDM muxed digital streams and using K-demuxing to recover the digital streams D1 to D32 accordingly. The recovered D2 data stream is connected to a router 2110 separating data sets for various applications, including those to be sent via a WiFi hub 2130 and those via a picocell hub 2120.

Three post processors 1340 for user 1, user 2 and user 32, respectively are shown in FIG. 3A. Each post processor 1340 comprises an ONU and key functions of K-demuxing 140. Optical waveforms or optical signals are received, and then demodulated by a demodulator (not shown) to become a bit stream of digital data, which is buffered, and then converted into 32 parallel substreams of digital samples (MD1 to MD32) by a device with function of TDM de-mux 1310. The 32 substreams of received digital samples are sent to a processor for 32-to-32 K-demuxing 140. The 32 output streams (D1 to D32) are the corresponding data streams in forward links for the 32 subscribers.

In another embodiment, a different version of preprocessor 1800 with functions of K-muxing 130 and an OLT 1200 when only 4 of 32 subscribers are participating on the "resource sharing" capability is illustrated in FIG. 3B; while corresponding K-demuxing 140 with ONUs 1300 are shown in FIG. 3D. More details of the functions of K-muxing 130, including input mapping, are depicted in FIG. 3C.

In a preprocessor 1800 shown in FIG. 3B, there are 4 subscribers (users 1, 16, 17, and 32) decided to participate on a resource sharing program. For a forward direction data delivery, a K-muxing 130 is reconfigured for 4-inputs and 4 outputs. The four inputs are input data streams to be delivered to the four users at the other end of the PON 1100 as the one shown in FIG. 3. The four outputs are connected to the four corresponding time slots of a 32-to-1 TDM mux 1210. The TDM mux 1210 usually features a first input port for the data for user 1, and a second input for input data for user 2, and so on. Therefore, the four K-muxed outputs MD1, MD16, MD17, and MD32 from the K-muxing 130 shall be sent to the first, the $16^{th}$, the $17^{th}$ and the $32^{nd}$ inputs of the TDM mux 1210 respectively. The remaining 28 user input data streams from D2 to D15 and from D18 to D31, shall be sent to the corresponding input ports of the TDM mux 1210. These 28 users are non-participants of the resource sharing program, and they will get a fixed maximum rate of data flow at 32 Mbps. The maximum data flow rate is calculated based on 1.024 Gbps total bit flow rate on a fiber distributed among 32 subscribers. Each subscriber will get 32 Mbps throughput. The optical laser 1230 provides an optical carrier for downstream communications in a fiber 1160, while the optical modulator 1220 converts a set of digital bit stream data into a continuous flow of optical signals or a stream of optical waveforms.

Details in one deeper layer of a version of the K-muxing 130 in FIG. 3B is illustrated in FIG. 3C. The selected version of the K-muxing 130 function comprises three major blocks: (1) 4 sets of input mapping 132, (2) a set of K-transforming or K-Xing 138 performing a 16-to-16 wavefront transformation, and (3) 4 sets of 4-to-1 TDM muxing 134. A 16-to-16 K-Xing 138 features 16 inputs and 16 outputs. Each input corresponds to $\frac{1}{16}$ of a total available bandwidth from a PON fiber network. As a result, among 4 concurrent users the total equivalent bandwidth or flow rate is 32 Mbps*4 or 128 Mbps. Estimated granularity for the resource allocation is $\frac{1}{4}$ of the maximum 32 Mbps flow-rate allowed for a subscriber, or 8 Mbps.

Each input mapping 132 features configurable functions of 1-to-N TDM demuxing with a constant output clocking rate of 8 Mbps, where N is an integer and $16 \geq N \geq 1$. Its input rate may vary from 8 Mbps to 128 Mbps.

In addition, a controller 136 is used to configure the 4 sets of input mapping function according to an embedded programmable algorithm. The program may decide bandwidth resources for individual users according to a priority list among the 4 users. As an example, a dynamic priority list reads as follows; (1) $1^{st}$ priority for user 1, (2) $2^{nd}$ priority for user 17, and (3) $3^{rd}$ priority for user 16, and user 32. A resource optimization algorithm allocates upper boundaries of 50% total bandwidth for the $1^{st}$ priority user, 25% for the $2^{nd}$ priority user, and 12.5% for each remaining two users.

The K-Xing 138 may perform a 16-to-16 Hadamard transform (HT) at a clock rate of 8 Mbps. Let us assume that 8-bit per sample as input samples then the Hadamard transform with 8-bit arithmetic operation will be clocked at 1 million clocks per second. As a result, the 16 outputs must also feature with 8-bit samples with a flow rate of 1 million samples per second. Every 4 of the 16 outputs are aggregated by a device performing 4-to-1 TDM muxing 134 at an output flow rate of 4 million samples per second. In addition, the device shall convert the muxed sample stream in the output to a bit stream at a flow rate of 32 Mbps. Thus, in the 4 bit-stream outputs corresponding to MD1, MD16, MD17, and MD 32, each sample shall feature a weighted sum of corresponding samples in D1, D16, D17, and D32. Similarly, a selected D1 sample shall appear and contribute to the corresponding 4 contiguous output samples in each of all 4 output bit-streams (MD1, MD16, MD17, and MD32). The weighting distribution of the selected D1 sample in the 4 sets of 4 contiguous samples (total 16 samples) shall be one of the 16 wave-front vectors (WFVs) associated with the function of 16-to-16 K-Xing 138 implemented by a 16-to-16 Hadamard transform.

Among the 4 K-muxed data streams, MD1, MD16, MD17, and MD32, a total flow rate of 128 Mbps (32 Mbps*4) is reserved in forward links or a down-stream direction for a PON distribution. The data stream D1 for the first user with a first priority will get an equivalent flow rate of 64 Mbps, and the data stream D17 for the $17^{th}$ user with a second priority shall feature a flow rate of 32 Mbps. Similarly, both the data streams D16 for the $16^{th}$ user and the data streams D32 for the $32^{nd}$ user feature a third priority. Each will get an equivalent flow rate of 16 Mbps.

Alternatively, when we use 64 bit arithmetic operations in the HT, each of the 16 bit stream inputs features a flow rate of 8 Mbps which is considered as a flow of digital samples with a flow rate of 125 K samples per second, or 125 KSps, with 64 bits per sample or 8 bytes per sample. The corresponding K-demuxing 140 not shown in ONUs must feature the same versions of HTs.

FIG. 3D depicts the functions of K-demuxing 140 in conjunction of ONU 1300 for 4 users. Four post processors 1340 for user 1, user 16, user 17, and user 32, respectively are shown. Each post processor 1340 comprises an ONU and key functions of K-demuxing 140. Optical waveforms or optical signals are received, and then demodulated by a demodulator (not shown) to become a bit stream of digital data, which is buffered, and then converted into 4 parallel substreams of digital samples (MD1, MD16, MD17, and MD32) by a device with function of TDM de-mux 1310 with 1 input and 32 outputs. MD1, MD16, MD17, and MD32 are the outputs from port 1, port 16, port 17 and port 32, respectively. They are also the 4 inputs to a device with function of K-demuxing 140. The functional diagram from K-demuxing 140 (shown in FIG. 3E) features inversed flows of the signals in K-muxing 130 in FIG. 3C, dynamically converting and transforming 4 input substreams of [MD1, MD16, MD17, Md32] with an equal data flow rate to 4 substreams of [D1, D16, D17, D32] with various data flow rate. Each of the 4 input is processed by a 1 to 4 TDM demuxing to become 4 substreams.

For the $1^{st}$ user, the 4-to-1 output switch 1320 will be set by a controller to deliver D1 stream, a right output stream from the 4 outputs of D1, D16, D17, or D32. D1 is flowing at a rate of 64 Mbps. The controlling signals are sent by a central command for the advanced PON. All the calculations have not included the processing overhead.

Details in one more layer of the K-demuxing 140 in FIG. 3D is illustrated in FIG. 3E. The K-demuxing 140 function comprises three major blocks, (1) 4 sets of 1-4 TDM demuxing 144, (2) a set of K-transforming or K-Xing 148 performing a 16-to-16 wavefront transformation, and (3) 4 sets of input mapping 132. A 16-to-16 K-Xing 148 features 16 inputs and 16 outputs. Each input corresponds to $\frac{1}{16}$ of a total available bandwidth from a PON fiber network. As a result, among 4 concurrent users the total equivalent bandwidth or flow rate is 32 Mbps*4 or 128 Mbps. The granularity for the resource allocation is $\frac{1}{4}$ of the maximum 32 Mbps flowrate allowed for a subscriber, and is 8 Mbps.

Each output mapping 142 features configurable functions of N-to-1 TDM muxing with a constant input clocking rate of 8 Mbps, where N is an integer and $16 \geq N \geq 1$. Its output rate may vary from 8 Mbps to 128 Mbps.

In addition, a controller 146 is used to configure functions of the 4 sets of output mapping 142 according to an embedded programmable algorithm which shall be informed by a command center responsible for the dynamic PON configuration. The program may decide bandwidth resources for individual users according to a priority list among the 4 users for both the input mapping 132 in K-muxing 130 and the output mapping 142 in K-muxing 140. As an example, a dynamic priority list reads as follows: (1) $1^{st}$ priority for user 1, (2) $2^{nd}$ priority for user 17, and (3) $3^{rd}$ priority for user 16, and user 32. A resource optimization algorithm allows 50% allocated for the Pt priority user, 25% for the $2^{nd}$ priority user, and 12.5% for each of the two remaining users.

The 4 inputs to the K-demuxing 140 are MD1, MD16, MD17, and MD32. Each sample in the 4 inputs shall feature a weighted sum of corresponding samples in D1, D16, D17, and D32 to be recovered. Each input is then connected by a device performing 1-to-4 TDM demuxing 144 at a output flow rate of 1 million samples per second, converting the muxed sample stream in a bit stream format at a flow rate of 32 Mbps to 4 outputs of bit stream each at a flow rate of 8 Mbps, or 1 million sample per second assuming 8 bits per sample There shall be 16 inputs to a device with functions of K-Xing 148, performing a 16-to-16 Hadamard transform (HT) at a clock rate of 1 M operations per second and converting 16 inputs to 16 outputs. Each of the inputs and outputs is flowing at 8 Mbps. We have assumed that 8-bit per sample as input samples then the Hadamard transform with 8-bit arithmetic operation will be clocked at 1 million clocks per second. As a result, the 16 outputs must also feature with 8-bit samples with a flow rate of 1 million samples per second. The outputs shall feature 16 substreams of separated flows of samples of D1, D16, D17, or D32.

Among the 4 K-muxed data streams, MD1, MD16, MD17, and MD32, a total flow rate of 128 Mbps (32 Mbps*4) is reserved in forward links or a down-stream direction for a PON distribution. The data stream D1 for the first user with a first priority will get an equivalent flow rate of 64 Mbps, and the data stream D17 for the $17^{th}$ user with a second priority shall feature a flow rate of 32 Mbps. Similarly, both the data streams D16 for the $16^{th}$ user and the data streams D32 for the $32^{nd}$ user feature a third priority. Each will get an equivalent flow rate of 16 Mbps.

There are 16 total substreams after going through a Hadamard transform concurrently. There shall be 4 output mapping 142 functions in parallel. The first output mapping shall convert $n_1$ substreams to a D1 stream, where $n_1=8$ in this example. Similarly, the $2^{nd}$, $3^{rd}$, and $4^{th}$ output mapping shall respectively convert $n_2$, $n_3$, and $n_4$ substreams to D16, D17 and D32 data streams. In this example $n_2=4$, $n_3=n_4=2$. The 4 sets of output mapping are controlled by a controller 146.

Embodiment 3

FIG. 4 depicts the same functional blocks as those in FIG. 2, except in the user side. The updated user processor 3100 comprises two smart array antennas; a first one for picocell hub 2110 and a second one for a WiFi hub 2130. The picocells are also referred to as small cells. Four antenna array elements 2232 for the picocell hub 2120 are connected to a device for function of digital beam forming (DBF) 3120. A first smart array is formed by the 4 elements 2232 and a first one (DBF 1) of the DBF 3120 for the Picocell hub 2120.

The first smart array shall operate on a cell phone band, connecting multiple cell phones 2236 to the picocell hub 2120 concurrently over a common field of view 2234. The smart array may form concurrent tracking beams with orthogonal beam patterns. For three cell phones 2236, the smart array shall automatically form three concurrent beams. The first beam shall be dynamically optimized following current position of a first cellphone with a beam peak at a first user direction while steering a first null and a second null, respectively, to the directions of the $2^{nd}$ and the $3^{rd}$ users. As a result, the transmitted signals intended for the first cellphone in forward direction is maximized in the first cellphone direction, and will not reach the second and the third cellphones. In receive, the received signals feature maximized sensitivity in the intended first cellphone direction, and minimized sensitivity (or zero response) at the directions of the second and the third cellphones.

By the same principles, a $2^{nd}$ beam shall be dynamically optimized following current position of the $2^{nd}$ cellphone with a beam peak at its direction while steering a first null and a second null, respectively, to the directions of the $1^{st}$ and the $3^{rd}$ cell phones. As a result, the transmitted signals intended for the $2^{nd}$ cellphone in forward direction is maximized in its direction, and will not reach the $1^{st}$ and the $3^{rd}$ cellphones. In receive, the received signals feature maximized sensitivity in the intended $2^{nd}$ cellphone direction, and minimized sensitivity (or zero response) at the directions of the first and the third cellphones.

For the concurrent $3^{rd}$ beam, it shall be dynamically optimized following current position of the $3^{rd}$ cellphone with a beam peak at its direction while steering a first null and a second null, respectively, to the directions of the $1^{st}$ and the $2^{nd}$ cellphones. As a result, the transmitted signals intended for the $3^{rd}$ cellphone in forward direction is maximized in its direction, and will not reach the $1^{st}$ and the $2^{nd}$ cellphones. In receive, the received signals feature maximized sensitivity in the intended $3^{rd}$ cellphone direction, and minimized sensitivity (or zero response) at the directions of the first and the second cellphones.

As a result of the first of the DBF 3120, DBF1, forming three tracking beams with OB patterns, the same frequency slot may be reused by three folds or 3× reused.

4 array elements 2132 for the WiFi hub 2130 are connected to a device (DBF 2) for DBF functions. A second smart array is form by the 4 elements 2132 and a second one of the DBF 3120 for the WiFi hub 2130. The $2^{nd}$ smart antenna shall operate on a WiFi band, connecting to multiple user devices such as notebooks 2136 concurrently over a second common fields of view 2134. The $2^{nd}$ smart array may also form concurrent tracking beams with orthogonal beam patterns. For two notebooks, the smart array shall automatically form two concurrent beams. The first beam shall be dynamically optimized following current position of a first notebook with a beam peak at a first user direction while steering a first null, respectively, to the direction of the $2^{nd}$ notebook. As a result, the transmitted signals intended for the first notebook in forward direction is maximized in the first notebook direction, and will not reach the second notebook. In receive, the received signals feature maximized sensitivity in the intended first notebook direction, and minimized sensitivity (or zero response) at the direction of the second notebook.

By the same principles, a $2^{nd}$ beam shall be dynamically optimized following current position of the $2^{nd}$ notebook with a beam peak at its direction while steering a first null to the direction of the $1^{st}$ notebook. As a result, the transmitted signals intended for the $2^{nd}$ notebook in forward direction is maximized in its direction, and will not reach the $1^{st}$ notebook. In receive, the received signals feature maximized sensitivity in the intended $2^{nd}$ notebook direction, and minimized sensitivity (or zero response) at the directions of the first and the notebook.

FIG. 4A depicts three cellphone inputs ($s_{p1}$, $s_{p2}$, and $s_{p3}$) and two other IP input streams ($s_{w1}$ and $s_{w2}$) as part of aggregated data input D2 for the second user at the headend via a network 1182 of a set of routers 2110 before the OLT 1200. D2 data stream after the PON network 1100 is delivered to the updated user processor 3100. We shall use the following formula to represent aggregated signals; $s_p$, $s_w$, and D2

$$s_p=[s_{p1},s_{p2},s_{p3}] \quad (3\text{-}1)$$

$$s_w=[s_{w1},s_{w2}] \quad (3\text{-}2)$$

$$\text{and } D2=[s_p,s_w,\dots] \quad (3\text{-}3)$$

An aggregated signal stream, $s_p$, comprises three cell phone data streams, $s_{p1}$, $s_{p2}$, $s_{p3}$, where $s_{p1}$ for a first cellphone, $s_{p2}$ for a $2^{nd}$ cellphone, $s_{p3}$ for a $3^{rd}$ cellphone. These signals are delivered to the cell phones via three shaped beams with OB patterns, which are continuously optimized by the DBF1 tracking all cellphone positions with a first common field of view 2234. They are re-radiated using cell phone bands.

For advanced applications in another embodiment, we may take advantages of 3× frequency reuse potential to concurrently deliver three independent information sets to three cell phones via the 3 shaped beams with OB patterns in a common frequency slot.

Similarly, another aggregated signal stream, $s_w$, comprises two IP data streams, $s_{w1}$, $s_{w2}$, where $s_{w1}$ for a first of the two notebooks 2136, $s_{w2}$ for a $2^{nd}$ of the notebooks 2136 within a second common field of view 2134 using same frequency slot in WiFi band. It can achieve a 2× frequency reuse. These signals are delivered to the notebooks 2136 via two shaped beams with OB patterns, which are continuously optimized by the DBF2 tracking all notebooks.

In this configuration, the flow rate in PON 1100 features 1 Gbps throughput total for 32 potential users. The maximum flow rate of the D2 stream for the second user is fixed at ~32 Mbps. FIG. 5 will depict other embodiments which can operate PON for D2 data stream associated with the same second user to exceed the maximum flow rate of ~32 Mbps.

Embodiment 4

FIG. 5 depicts a PON with K-muxing configuration 1180 in conjunction with the DBF 3120 in a user processor 3100. The PON with K-muxing configuration 1180 comprises a PON 1100 and a K-muxing 130 which enables D2 data stream associated with the same second user to exceed a maximum flow rate of ~32 Mbps. A network 1182 for D2 data stream for the second user identical to that as shown in FIG. 4A may comprise inputs ($s_{p1}$, $s_{p2}$, and $s_{p3}$) for three cell phones 2236, and those ($s_{w1}$ and $s_{w2}$) for the two notebooks 2136 before the k-muxing 130. The functions of K-muxing 130 have been described extensively and shown in FIG. 3 and FIG. 3B. We will not describe them here again.

In short the K-muxing 130 enables the D2 stream being delivered to the user processor 3100 via unused and available bandwidth asset in the PON 1100. The delivery flow rate which may exceed an upper limit set by the time slots by the TDM mux 1210 in the OLT 1200.

The functions of K-muxing 130, in general, may be implemented by software in a hosting processor for better flexibility, by additional hardware for faster processing speed to the hosting processor, or by combinations of the above for compromised performance with flexibility and speed.

FIG. 5A depicts functions of updated ONUs 1340, each of which comprises a regular ONU 1300 and a K-demuxing 140. The functions of K-demuxing 140 have been shown extensively in FIG. 3A and FIG. 3D. We will not repeat them in here again. In addition, updated ONUs 1340 feature same functions as those in FIG. 3A or those in FIG. 3D.

Embodiment 5

FIG. 6 depicts a configuration of PON in conjunctions of using remote digital beam forming. A first remote digital beam forming RDBF 6102A is for cell phone signals ($s_{p1}$, $s_{p2}$, and $s_{p3}$) to be delivered to three cellphones 2236, respectively through three tracking beams which are radiated by the four array elements 2232. The radiations feature dynamic OB beam patterns following the three slow moving cellphones over a first common field of view 2234. The RDBF1 6102A shall feature three inputs and one muxed output, spe, which comprises 4 element signal components to be radiated by the four radiating elements 2232 for the cellphone hub 2120. Each element signal comprises a sum of weighted signals for three cell phone signals ($s_{p1}$, $s_{p2}$, and $s_{p3}$). $s_{p's}$ stands for all three sets of $s_p$ signals.

Similarly, the RDBF2 6102B shall feature two inputs and one muxed output, swe, which comprises 4 element signal components to be radiated by the four radiating elements 2132 for a WiFi hub 2130.

There are two input sample streams $s_{w1}$ and $s_{w2}$ for the DBF in RDBF2 6102A. Each is replicated 4 times and then weighted individually by a beam weight vector (BWV) with 4 components. The 4 outputs feature sums of the two weighted inputs.

$$E1=w11*s_{w1}+w12*s_{w2} \tag{3a}$$

$$E2=w21*s_{w1}+w22*s_{w2} \tag{3b}$$

$$E3=w31*s_{w1}+w32*s_{w2} \tag{3c}$$

$$E4=w41*s_{w1}+w42*s_{w2} \tag{3d}$$

The two BWV's for the two beams featuring dynamic tracking capability with OB radiation patterns are represented as follows:

$$BWV1=[w11,w21,w31,w41]^T \tag{4a}$$

$$BWV2=[w12,w22,w32,w42]^T \tag{4b}$$

The four element signal streams (E1 to E4) are then FDM muxed into a single output swe.

As indicated in equations (3), each element signals comprises a sum of weighted signals for two notebook signals ($s_{w1}$, and $s_{w2}$), which will be delivered to the two notebooks 2136, respectively through two tracking beams. These tracking beams are radiated by the four WiFi array elements 2132. The radiations feature dynamic OB beam patterns following the two re-locatable notebooks over a second common field of view 2134. The first FOV 2234 and the second FOV 2134 may have very significant overlaps in coverage.

The two muxed outputs, spe from RDBF1 6102A and swe from RDBF2 6102B, along with others such as s2c depicted in FIG. 6 are multiplexed again by a muxing device 6104 before sent to s2 input of the K-muxing 130.

It is notice that we have used (s1, s2, s3, . . . , s32) in here instead of (D1, D2, D3, D32) in previous figures to indicate the inputs of the K-muxing 130 are signal samples (in waveform domain or after modulation in transmission), and not data samples (in information domain or before modulation in transmission). The K-muxing 130 as a part of preprocessing in the OLT 1200 shall operate in a coherent mode processing samples of signal waveforms or signals in the TDM optical channels.

The PON 1180 shall be operating in a mode of Radio Frequency over Glass (RFoG). The TDM mux 1210 will convert 32 parallel signal sample streams into one muxed sample stream. The mixer 1220 will function as for a heterodyne up-converter to optical frequency band. The laser 1230 will provide an optical carrier.

Differential amplitude variations and phase delays among the optical channels shall be calibrated, and compensated dynamically. Calibration and compensations are part of equalization process which can be done continuously and iteratively optimized. It may also be implemented periodically via matrix inversion optimization. The optimization for dynamic equalization may be implemented in the headend 6100 or user ends as a part of upgraded ONU's 6300. As a result, the equalized multiple channels can be used to transport element signals to be radiated coherently from a first remote digital beam forming 6102A to a set of radiating elements 2232 of an array for transmission of cell phone signals over a common field of view 2234 in a user facility via the user processor 3100.

In the user processor 3100, a demuxing device 2110 shall perform inverse functions of functions of the muxing device 6104 in the headend 6100, separating the signal flows of spe, swe, and s2c. The picocell hub 2120 shall receive a first muxed 4-element signal stream, spe, which is connected to one of the two FDM demux 6510 and being converted to 4 element signal streams. These element signals streams are then sent to the 4 radiating elements 2232 respectively. Concurrently the WiFi hub 2130 shall receive a second muxed 4-element signal stream, swe, which is connected to one of the two FDM demux 6510 for conversion to 4 element signal streams. These element signal streams are then sent to the 4 radiating elements 2132 respectively.

The multiple beam coverage in the first common FOV 2234 for three cellphones 2236 and the second common FOV 2134 for the two notebooks 2136 have been discussed in previous FIG. 4 and FIG. 5. We will not repeat the details in here again.

The K-muxing 130 is operating on signal samples over multiple TDM optical channels. Similarly, the K-demuxing in updated ONUs 6300 shall also feature processing on signal samples among multiple optical TDM channels. FIG. 6A depicts the K-demuxing 140 for coherent operation in 3 updated ONU's 6300: ONU 1, ONU 16, and ONU 32. In one of the ONU's 6300, say ONU 1, k-muxed signal streams transported by multiple channels of a PON 1100 are recovered by a device performing TDM demux 1310. The outputs are dynamically equalized by an equalization, calibrating and compensating differentials of amplitude variations and phase delays among propagating signals through the multiple TDM channels. Signals from the 32 equalized channels are then sent to a device performing K-demuxing 140 with 32 outputs. The first of the 32 output is selected by a switch 1320 and delivered as the output of ONU 1.

The optimization techniques have been discussed extensively in the reference of U.S. Pat. Appl. Pub. No. 20130223840. Optimization inputs may be replications of some of normal outputs of the K-demuxing 140. In addition, when s1, s16, and s32 for the 3 users are uncorrelated at the headend, it is also possible to use correlations among these three received signals at a user end, detecting "leakages" thus indications of un-equalized propagation channels. These leakages may be used as performance "cost" in optimization schemes which features cost minimization to achieve fine tuning of equalizations of amplitude variations and phase delays among multiple dynamic propagation channels.

Embodiment 6

FIG. 7 depicts a down-stream, or a forward link, functional block diagram for small cells and remote DBF via PON for multiple house-holds using identical functional blocks as those in FIG. 6. In the downstream direction, the OLT 1200 continuously transmits (or may burst transmit). ONUs see their own data through the address labels embedded in the signal. The block diagram is for delivering three digital cell phone data streams ($s_{p1}$, $s_{p2}$, and $s_{p3}$), including digital voices, from a headend 6100 to three cellphones 2236-1 to 2236-3, respectively over a coverage area 7234.

The three cellphone data streams ($s_{p1}$, $s_{p2}$, and $s_{p3}$) are sent to a remote digital beam forming processor, RDBF1 6102A, which calculates and implements weighted sums for three concurrent beams to be radiated by the radiating elements associated with the 4 post-processors, 7232-1 to 7232-4, over households of 4 customers.

The associated element signals implemented by the RDBF1 6102A for the 4 radiating elements associated with the 4 post processors 7232-1 to 7232-4 are as followed;

$$Ep1 = w1*s_{p1} + w12*s_{p2} + w13*s_{p3} \tag{5a}$$

$$Ep2 = w21*s_{p1} + w22*s_{p2} + w23*s_{p3} \tag{5b}$$

$$Ep3 = w31*s_{p1} + w32*s_{p2} + w33*s_{p3} \tag{5c}$$

$$Ep4 = w41*s_{p1} + w42*s_{p2} + w43*s_{p3} \tag{5d}$$

The three BWV's for the three beams featuring dynamic tracking capability with OB radiation patterns are represented as follows:

$$BWV1 = [w11, w21, w31, w41]^T \tag{6a}$$

$$BWV2 = [w12, w22, w32, w42]^T \tag{6b}$$

$$BWV3 = [w13, w23, w33, w43]^T \tag{6c}$$

Each element signal is sent to a corresponding input of a K-muxing 130 which features N-inputs and N-outputs where N=4. The K-muxing 130 features similar functional blocks as the ones in FIG. 3C. The 4 outputs are sent to 4 of the 32 inputs of a 32-to-1 TDM muxing in the OLT 1200 (see FIG. 3B). The element signals are embedded in an optical signal stream propagating trough the fiber 1160.

A passive fiber network comprises (1) a first fiber segment 1160 connected between an OLT 1200 and a passive divider 1150, (2) second fiber segments connected to a passive divider 1150 to a ONU, and (3) third fiber segments connected between passive dividers 1150.

In the downstream direction, the OLT 1200 continuously transmits optical signal streams. Individual ONUs see their own data through the address labels embedded in the signal. Corresponding post processors 7232-1 to 7232-4 shall recover the element signal streams in RF, which will then be conditioned (amplified and filtered), converted to a desired frequency slot in cellphone band, power amplified, before being sent to respective antenna element for radiation.

These four elements are usually separated by a large distance (>10 in or in terms of 50's or even 500's of cell-band wavelengths) from one another, forming an array by the RDBF1 6120A for a clean connection to a first cellphone 2236-1, that for a second cellphones 2236-2, and that for a third cellphone 2236-3 over a coverage area 7234 in near fields. The coverage area 7234 shall include 4 field-of-views (FOVs) of the four individual elements: a first element FOV 2234-1, a second element FOV 2234-2, a third element FOV 2234-3, and a fourth element FOV 2234-4.

Each of the 4 post processors 7232 comprises an updated ONU 6300, a picocell hub 2120, and a cell antenna 2232. These are identical to the ones shown in FIG. 6.

A first dynamically shaped beam is for the 1st cellphone 2236-1 and shall feature a tracking beam peak at the location of the $1^{st}$ cellphone with two tracking nulls at the locations of the $2^{nd}$ and the $3^{rd}$ cellphones. Similarly, a $2^{nd}$ dynamically shaped beam shall feature a tracking beam peak at the location of the $2^{nd}$ cellphone 2236-2 with two tracking nulls at the locations of the $1^{st}$ and the $3^{rd}$ cellphones 2236-1 and 2236-3. In addition, a $3^{rd}$ dynamically shaped beam shall feature a tracking beam peak at the location of the $3^{rd}$ cellphone 2236-3 with two tracking nulls at the locations of the $1^{st}$ and the $2^{nd}$ cellphones 2236-1 and 2236-2. The three dynamic shaped beams operated in a same frequency slot, featuring 3× frequency reuse, shall have very little mutual interferences.

In the upstream direction (not shown), each ONU burst transmits for an assigned time-slot (multiplexed in the time domain). In this way, the OLT is receiving signals from only one ONU or ONT at any point in time. However, with a K-demuxing 140, which features 4 inputs and 4 outputs, in place for the headend 6100, the OLT shall be receiving signals from only one ONU at most point in time, but shall be capturing 4 muxed signals from 4 participating ONUs at assigned 4 time slots, assuming the lasers for the 4 ONUs emitting in an identical optical wavelength.

When the lasers for the 4 ONUs emitting in different optical wavelength, there shall have multiple optical spectrum lines in assigned received time slots. Each modulated optical line in the spectrum shall be associated to a specific ONU. Additional processing using advanced filtering techniques are required to separate the modulating RF signals for individual optical wavelength. Thus, RF signal streams from individual ONUs are captured separately for further processing.

Multibeam RDBF Ground Terminals for Satellite Constellations in Non-Geostationary Orbits (NGSO)

Since 2015, there have been many proposals for satellite constellations filed with the Federal Communications Commission (FCC) in C, Ku, Ka, V bands, and other bands in non-geostationary orbit (NGSO) for IP connectivity including proposed systems by companies such as SpaceX, Oneweb, Boeing, and others. The proposed constellations range from less than 1000 to more than 5000 satellites, and many of them will be orbiting at around 1200 Km in altitude, providing broadband "last mile connectivity" or broadband accessing to subscribers. A subscriber on ground shall gain access of wide bandwidth or high data rate via multiple satellites concurrently. With a simultaneous view of 40 or more satellites, a subscriber will access a set of the satellites in a field-of-view (FOV) of its multi-beam terminal. The terminal shall feature multiple beams concurrently in a common frequency slot, and may also feature multiple sets of the multiple concurrent beams at various frequency slots. The multiple beams for communications services, at least two concurrent receiving (Rx) beams, are referred to as service beams. DBF are very cost effective in forming multiple Rx beams. For instance, additional Rx beams may be formed for probing and diagnostic purposes. Diagnostic beams are not for receiving information data and may feature fast hopping beams, as an example, to detect radiated power levels from various pre-determined beam positions as in autonomous tracking loops initiated by a beam controller at the terminal.

The techniques using low cost passive optical network (PON) for remote digital beam forming (RDBF) networks may also be utilized in implementing advanced ground terminals for communicating to NGSO satellites. The K-muxing overlaid over a PON is similar to the ones previously described ire FIGS. 4, 4A, 5, and 6. Most of the PON for this purpose shall be less than 100 methers long connecting an outdoor unit and an indoor unit of an advanced multibeam RDBF ground terminal.

FIG. 8 depicts a receiving (Rx) RDBF ground terminal 8000 for satellite communications utilizing non-geostationary orbits (NGSO) satellites. It comprises an outdoor unit 8200 and an indoor unit 8100; interconnected via optical fibers 1160. The outdoor unit 8200 comprises an RF array antenna 8232 with multiple receiving elements, low noise amplifiers (INA) 822, a pre-processor 130 with K-muxing transform, and RF-to-optical drivers or optical modulators in an optical line terminal (our) 1200. Each RF block 824 performs analog-to-digital conversion by either direct sampling on the output signal of the corresponding LNA 822, or frequency down-converting, filtering and digitizing of the output signal of the corresponding LNA 822. The RF antenna elements are tuned to the operating frequency band of targeted NGSO satellites in C, KU, Ka, or V-bands.

The details of an OLT 1200 are shown in FIG. 3. The information data used in the function of optical modulating 1220 (FIG. 3) is the direct modulating input in the OLT. The second inputs for optical modulating 1220 are embedded optical lasers 1230 (FIG. 3) serving as the optical carrier sources for optical modulators with the optical modulating 1220 functions. The optical modulators for optical modulating 1220 functions convert bit streams of information data to a stream of optical waveforms, which is sent to the indoor unit 8100 via optical fibers 1160.

FIG. 8 depicts an example of an Rx RDBF ground terminal 8000 capturing 7 signal streams from 7 moving satellites in the NGSO satellites 8300 in its field of view, and converting the captured signal streams into 7 data streams A1 to A7 via a bank of demodulators 8104. The receiving array antenna 8232 comprises 30 elements, at Ku, Ka, or other selected frequency band, featuring multiple dynamic high gain "narrow" beams with a beamwidth slightly less than 15° each when pointed to directions near the array boresight. It shows 7 service beams on a common frequency slot. Each beam will independently track a moving satellite traveling through the FOV of the Rx RDBF ground terminal 8000.

In general, an array antenna with Ne elements can support Nb independent beams concurrently, where Ne and Nb are positive integers and Ne≥Nb. When the spacing for adjacent elements of the array antenna is larger than or equal to a half wavelength of the radiating/receiving RF frequency, the array antenna with Ne elements can form a set of Nb beams with orthogonal beam (OB) patterns, for which the peak of a first OB beam is pointed at a first direction where a null of each of the other Ne-1 OB beams will be located, and the first OB beam will also feature Ne-1 nulls at various Ne-1 directions where peaks of the other Ne-1 OB beams are pointed to. For applications of RDBF ground terminals for NGSO satellite communications, it will be very cost effective to use arrays with no less than 10 Rx/Tx elements.

Digital beam forming (DBF) networks in general are very cost-effective in forming multiple Rx beams. Therefore, via the Rx RDBF 8102 network in the ground terminal 8000, the array 8232 shall form additional beams for probing or diagnostic purposes providing information or measured intelligence for a beam controller 8140 which shall determine what the available satellites are, which directions these tracking beams shall be pointed to in the next time slots, what to do to avoid high mutual interferences among these beams, and so on. The beam controller 8140 will take these results into consideration in deciding and calculating beam weighting vectors (BWVs) for the 7 tracking beams for a next update or for next few updates.

We may use a technique generating multiple ($N_b$) beam positions surrounding each of tracked moving satellites within the field of view (FOV) of the ground terminal 8000. The FOV may feature an entire angular region of 20 degrees above horizon. We may choose $N_b=6$. For each tracked satellite, a diagnostic beam will hop over the satellite current position and $N_b=6$ additional surrounding beam positions. To support 7 tracked satellites, diagnostic beams must visit 49 different beam positions multiple times within a tracking cycle time, say, Tf=1 second. Assuming a 2-millisecond (ms) dwell time on each position measuring emitted RF signal power levels with signatures or identifications by satellites, it is possible to command a diagnostic beam by the beam controller to visit all 49 possible beam positions 10 times. The emitted signal signatures or identifications may simply be the radiated frequency, modulation, and/or other features. With two agile diagnostic beams, it becomes possible to visit these beam positions 20 times in one-second tracking cycle time. Additional diagnostic beams may probe beam positions at periphery of the field of view of the ground terminal 8000 for newly arrived satellites.

In other embodiments, the beam positions for diagnostic beams may be designed and planned by the beam controller according to predicted satellite tracks. Each satellite track in the FOV of the ground terminal from an entrance to an exit will be covered by multiple (Mb) overlapped beam positions, where Mb ranges from 10 to 20. There may be a total of 100 potential beam positions to be covered by 4 diagnostic beams. They can provide 40 independent measurements on each beam position within one-second tracking cycle time.

The optical fibers 1160 are connected to the RF-to-optical drivers of the OLT 1200 in the outdoor unit 8200 and optical-to-RF converters of an ONU 1300 in the indoor unit 8100. The indoor unit 8100 comprises a post processor 140 with K-demuxing transform, and Rx Remote digital beam forming (RDBF) 8102 networks followed by a bank of RF demodulators 8104. It further comprises a set of adaptive equalizers 140A controlled by an iterative optimization loop 8106.

To implement the fiber connection cost-effectively we shall take advantage of the optical fiber connections via a PON standard, instead of using special designs or customized optical connections. Conventional PON systems, such as 10G EPON, are TDM standards. The standards for even broader bandwidth may include optical fiber connections comprising wavelength division multiplexing (WDM) standards.

An Rx RDBF ground terminal 8000 may be implemented on a mobile platform, such as a passenger car, a bus, a train, and others. The outdoor unit 8200 is located on the roof of a mobile platform, and while the input unit 8100 is located in the cabin of the mobile platform. For a stationary RGBF terminal, the outdoor unit 8200 is located on premises of a home, while the indoor unit 8100 is located inside of a set-top-box (SIB) placed in the home. The RDBF 8102 network in the indoor unit may form dynamic beams with orthogonal beam patterns tracking various NGSO satellites 8300 within the field of view of the ground terminal. The remote digital beam-forming network may form multiple diagnostic beams to continuously probe identities of the satellites and where the satellites are moving to, within a field-of-view of the receiving terminal.

For an Rx RDBF terminal, the K-muxing transform in the pre-processor 130 in the outdoor unit may be a Hadamard transform matrix, a Fourier transform matrix or a combination of both. It may also be another N-to-N orthogonal matrix, or a N-to-N full-rank matrix, where N is an integer greater than 1. Similarly, the corresponding K-demuxing transform in the post-processor 140 in the indoor unit 8100 shall be a Hadamard transform matrix, a Fourier transform matrix, or a combination of both. The K-demuxing transform in the post-processor 140 in the indoor unit shall be the inverse of the chosen N-to-N orthogonal matrix, or the chosen N-to-N full-rank matrix for the K-muxing in the outdoor unit 8200. The inverse of an orthogonal matrix is its transpose and therefore another orthogonal matrix.

Similarly, a transmitting (Tx) RDBF ground terminal for communications systems via NGSO satellites 8300 can be implemented in the same indoor unit 8100 and the same outdoor unit 8200 that are interconnected via the same optical fibers 1160. These blocks are not depicted in FIG. 8. The indoor unit for Tx functions shall have an additional bank of RE modulators, a pre-processor with Remote Tx digital beam forming (RDBF) networks, followed by a K-muxing transform, and then the RF-to-optical drivers for optical modulating 1220. The indoor unit further comprises another set of adaptive equalizers for pre-distortion compensations controlled by an optimization loop. The optical fibers are connected to the optical-to-RF converters for optical de-modulating 1224 in an outdoor unit and RF-to-optical drivers for optical modulating 1220 in the indoor unit. The pre-distortion compensations are to dynamically equalize the propagation differentials in phases and amplitudes of signals in the TDM, WDM, or other multiplexed channels in fibers in a PON. The outdoor unit 8200 shall also feature optical-to-RF converters for optical de-modulating 1224, a post-processor with K-demuxing transforms, power amplifiers (PA), and Tx functions of the same RF array antenna 8232.

RDBF Basestations for Cellular Communications Via PON

In another embodiment, the multichannel PON connectivity is used for 5G wireless mobile services in MIMO basestations. As shown in FIG. 9 for a basestation in a transmitting (Tx) mode, we may install the RF array 9232 with N array elements 9232-1 to 9232-N on an RF tower 9200, and place a remote Tx MIMO processor 9102 comprising a MIMO processing assembly 9102A and a remote digital beam forming (RDBF) 6102A network or processors in an indoor processing facility 9100. The outdoor RF tower 9200 and the indoor processing facility 9200 are connected by optical fibers 1160. To be cost effective, the communications in the optical fibers 1160 may use COTS hardware and software under PON standards.

Many MIMO wireless configurations take advantage of multiple propagation paths due to signal scattering and reflections to enable multiple folds of frequency reuses between a transmitter at a source and a receiver at a destination via multiple elements in transmit at the source and multiple elements in receiving (Rs) at the destination. A Tx MIMO processor organizes the multiple Tx elements at the source, and an Rx MIMO processor organizes the Rx elements. Scattering and reflections are highly dependent on MIMO operational environments. The parameters of propagation effects are referred to as channel state information (CSI) which is continuously and dynamically measured pair-by-pair between Tx elements at a source and Rx elements at a destination. Many Tx MIMO processors for multiple element arrays usually generate wireless connection with high connectivity via a set of linear combinations of array elements toward some of receiving elements at a destination, while doing discrimination against other receiving elements.

Unlike conventional beam forming which are directional-based, the MIMO connection and discrimination functions by the MIMO processor 9102 are element-index based. For instance in a MIMO communication with 4 Tx array elements at a source and 6 Rx elements in a destination, a dynamically measured. CSI parameter, h32, is referred to as a first transfer function which is a quantitatively measured amount of a propagation phase delay and associated relative attenuation from a second Tx element of the 4-element Tx array to a third Rx element of the 6-element Rx array, while another CSI parameter, a second transfer function h63, shall indicate the amount of a propagation phase delay and associated relative attenuation from a third Tx element of the 4 element. Tx array to a sixth (6th) Rx element of the Rx array. It is noted that the CSI parameters are specified as functions of indexes of Tx elements and Rx elements. The performances of a MIMO array antenna and its MIMO processing feature element-indexed descriptions.

On the other hand, in conventional beam forming performance, the connectivity of an array antenna is quantified by an antenna gain at a beam peak while the discriminations are measured in null depth in dB relative to its beam peak at specified directions. For instance, we may specify performance of a 15-element linear array antenna for a shaped spot beam as the following; (1) a beam peak of 20 dB at −2° away from the array boresight, and (2) −50 dB nulls at ±3° and ±5° away from the beam peak. It is noted that most performances in conventional beam forming processors are referred to as functions of angles or directions. The performances of an array antenna and its conventional beam forming feature direction-based descriptions.

Many MIMO arrays feature only digital MIMO processor without beam forming processors at all. However, U.S. Patent Application Publication Number 20140161018 presents MIMO configurations with both MIMO processors and digital beam forming (DBF) networks. In a multi-user MIMO, the serving signals for transmission to user equipment (UE) in spoke-and-hub configurations from a hub will utilize composited transfer functions (CTF) selected and characterized based on channel state information (CSI), which comprises responses from probing signal sequences for multipath dominated propagation channels in accordance with a dynamic distribution of users 2236. A composited transfer function (CTF) is a point-to-multipoint transfer function and is constructed by combining multiple point-to-point transfer functions. The combining and shaping are via beam forming optimizations in transmitters to be "user element dependent" with enhanced responses to a selected user array element and suppressed responses to other user elements. The composited transfer functions (CIEs) are constrained by desired performance criteria, which are not specified as functions of directions in angles, but as functions of the indexes of user array elements, which are the identifications in UE. These are referred as user indexed constraints. In this case, the MIMO processing and DBE processing are separately implemented by two different devices or software blocks.

The techniques using low cost passive optical network (PON) for remote digital beam forming (RDBF) networks may also be utilized in basestations of wireless cell phone systems, including 5G MIMO basestations. The K-muxing overlaid over a PON is similar to the ones previously described ire FIGS. 4, 4A, 5, and 6. Most of the PON for this purpose shall be less than 10 Km long connecting an outdoor RE tower of the basestation and an indoor processing facility for wireless cell communications. The indoor processing facility shall be connected to broadband IP transport networks. It is likely that an indoor processing facility performs remote processing for multiple outdoor towers. Similarly, signals for the radiating (or those from the receiving) elements from an outdoor RF tower are sent from (or to) multiple indoor processing facilities. In general, the distance between an indoor facility and a connected outdoor RF tower shall be less than 10 Km.

FIG. 9 depicts a MIMO basestation 9000 for a cellular communications system in a transmitting (Tx) mode, which comprises an indoor processing facility 9100 and an outdoor RF tower 9200 including radiating/receiving elements. The indoor processing facility 9100 and an outdoor RF tower 9200 are interconnected via optical fibers 1160. The indoor facility 9100 comprises a bank of RF modulators 9104 converting data streams to waveforms, a remote MIMO transmitting processor 9102, a pre-processor 130 with K-mixing transform, and RF-to-optical drivers in an optical line terminal (OLT) 1200 for optical modulating functions. The optical fibers 1160 with multiple optical communications channels connect the RF-to-optical drivers in the indoor processing facility 9100 and optical-to-RF converters of an ONU 1300 in the outdoor RF tower 9200. The outdoor RF tower 9200 is equipped with optical-to-RF converters for optical demodulating functions in the OW 1300, a post-processor 140 with K-demuxing transform, power amplifiers 922 (PA), and RF array antennas with multiple transmitting elements 9232-12 to 9232-N. Each RF block 924 performs frequency up-converting, bandpass filtering and buffer amplifying. FIG. 9 depicts three mobile users with MIMO cell phones 2236-$m1$, 2236-$m2$ and 2236-$m3$ or other MIMO user equipment. The three signal streams Sp1, Sp2 and Sp3 which are converted from three input data streams A1, A2, and A3 by the bank of RF modulators 9104 at the basestation 9000 are intended for the three mobile users with MIMO cell phones 2236-$m1$, 2736-$m7$, and 2236-$m3$ via wireless channels in a common RF frequency slot through a multipath-rich propagation environment 9300.

The remote MIMO transmitting (Tx) processor 9102 in the indoor processing facility 9100 of the MIMO basestation 9000 will continuously measure the channel status information (CSI) by sending probing signals to antenna elements in destinations. The MIMO Tx processor 9102 will also receive responded probing signals from antenna elements in the destination. The indoor processing facility 9100 may have a dedicated digital MIMO processing assembly 9102A to measure various dynamic transfer functions for CSI, and to enable frequency reuses by generating favorable coherent gains to some receiving elements and discriminations against other using elements. These elements in both Tx and Rx ends are not identified through relative directions in their dynamic geometries but by unique indexes associated with the elements. The connection and discrimination functions are made in the MIMO processing assembly 9102A in terms of the elements identified via indexes. It is an optimization processing in a space with indexes of array elements; referred to as an element-indexed space. It takes advantages of a multi-path rich propagation environment 9300 creating multiple concurrent channels from the RF tower to a destination. The remote MIMO Tx processor 9102 may comprise remote digital beam forming (RDBF) networks 6102A, remote composited transfer function (CTF) networks in a digital MIMO processing assembly 9102A for the purposes of achieving point-to-multipoint performance constraints in an element-indexed space.

The indoor processing facility 9100 further comprises a set of adaptive equalizers 140A following the K-muxing 130 transform. The equalizers 140A controlled by an optimization loop 9106 will perform pre-distortion compensations for multichannel propagation signals in the optical fibers which support optical communications via a passive optical network (PON) standard, a wavelength division multiplexing (WDM-PON) standard, in one of the RFoG network standardized options, or others.

The RDBF 6102 network in the remote MIMO Tx processor can be configured to form multiple spot beams pointing to various directions within a field of view of the transmit elements on the outdoor RF tower. It operates to form multiple shaped beams with partial overlapped covered areas within the field of view of the transmit elements on the outdoor RF tower.

The K-muxing 130 transform in the preprocessor for the indoor processing facility 9100 comprises a Hadamard transform matrix, a Fourier transform matrix, a N-to-N orthogonal matrix, a N-to-N full-rank matrix, where N is an integer greater than 1, or a combination of all the above. Correspondingly, the K-demuxing transform in the post-processor 140 in the outdoor RF tower 9200 of the MIMO basestation 9000 in a transmitting mode comprises a Hadamard transform matrix, a Fourier transform matrix, a N-to-N orthogonal matrix, a N-to-N full-rank matrix, where N is an integer greater than 1, or a combination of all the above.

In a receiving (Rx) mode for a cellular communications system, a MIMO basestation will perform functions that are reverse of the transmitting mode functions. The MIMO station in an Rx mode comprises an outdoor RF tower including radiating/receiving elements and a remote indoor processing facility, interconnected via optical fibers. The outdoor RE tower comprises RF array antenna with multiple Rx elements, low-noise amplifiers (LNAs), a pre-processor with K-maxing transforms, and RF-to-optical drivers for optical modulating functions. The optical fibers connect the RF-to-optical drivers on the outdoor RF tower to optical-to-RF converters in the indoor processing facility. The indoor processing facility comprises the optical-to-RE converters for optical de-modulating functions, a postprocessor with K-demuxing transforms followed by a MIMO receiving (Rx) processor, and a bank of RF de-modulators.

The RF array antenna may operate at current mobile cellular communications frequency bands; such as 1700/2100 MHz, 2600 MHz, 850 MHz, 1900 MHz and others in U.S. and Canada. Planned 5G cellular systems may operate below 6 GHz and also at selected millimeter frequency bands. The RF array for MIMO may operate in a WiFi frequency such as 2.4 GHz, 3.6 (3 Hz, 4.9 GHz, 5 GHz 5.9 (3 Hz and others.

In most applications for continuously measuring the channel status information (CSI), the basestation will initiate procedures by sending probing signals via the Tx ports of various antenna elements at the basestation. The MIMO Rx processor in the indoor processing facility of the MIMO basestation will collect the responses of the probing signals sent by various array elements from different users. The responses usually are unique acknowledgement signals to various antenna elements of users. In other applications the CSI measurement may be initiated by users. The MIMO Rx processor in the indoor facility of the MIMO basestation shall respond to the probing signals sent by various users with unique acknowledgement or signature signals.

The MIMO Rx processor in the indoor processing facility may comprise RDBF networks which can be configured to form multiple spot beams pointing to various directions within a field of view of the Rx elements on the outdoor RF tower. It operates to form multiple shaped beams with partial overlapped covered areas within the field of view of the Rx elements on the outdoor RF tower.

The indoor processing facility further comprises a set of adaptive equalizers for distortion compensation for multi-channel propagation signals in the optical fibers which support optical communications via a passive optical network (PON) standard, a wavelength division multiplexing (WDM-PON) standard, in one of the RFoG network standardized options, or others.

The K-muxing transform in the preprocessor for the outdoor RF tower facility comprises a Hadamard transform matrix, a Fourier transform matrix, a N-to-N orthogonal matrix, a N-to-N full-rank matrix, where N is an integer greater than 1, or a combination of all the above. Correspondingly, the K-demuxing transform in the post-processor in the indoor processing facility of the MIMO basestation in a Rx mode comprises a Hadamard transform matrix, a Fourier transform matrix, a N-to-N orthogonal matrix, a N-to-N full-rank matrix, where N is an integer greater than 1, or a combination of all the above.

What is claimed is:

1. A MIMO basestation for a cellular communications system comprising:
    a remote indoor processing facility comprising:
        a bank of RF modulators configured to modulate signal streams;
        a remote MIMO transmitting processor comprising a remote digital beam-forming network configured to receive the modulated signal streams and generate transmit beam signals;
        a pre-processor configured to perform a wavefront multiplexing transform on the transmit beam signals to generate wavefront multiplexed beam signals, each of the wavefront multiplexed beam signals being a linear combination of the transmit beam signals; and
        RF-to-optical drivers configured to perform optical modulating functions on the wavefront multiplexed beam signals to generate optical waveform streams; and
    optical fibers configured to couple the RF-to-optical drivers to an outdoor RF tower.

2. The MIMO basestation of claim 1, wherein the remote indoor processing facility further comprises:
    a set of adaptive equalizers coupled to the pre-processor and configured to perform pre-distortion compensation for signals propagating in the optical fibers; and
    an optimization loop unit configured to control the set of adaptive equalizers.

3. The MIMO basestation of claim 1, wherein optical communications between the remote indoor processing facility and the outdoor RF tower through the optical fibers are via a Passive Optical Network standard or a wavelength division multiplexing (WDM) standard.

4. The MIMO basestation of claim 1, wherein the wavefront multiplexing transform comprises one of a Hadamard transform matrix, a Fourier transform matrix, an N-to-N orthogonal matrix where N is an integer greater than 1, or an N-to-N full-rank matrix where N is an integer greater than 1.

5. The MIMO basestation of claim 1, wherein the outdoor RF tower comprises:
    optical-to-RF converters configured to receive and optical demodulate the optical waveform streams to recover the wavefront multiplexed beam signals;
    a post-processor configured to perform a wavefront demultiplexing transform on the recovered wavefront multiplexed beam signals to recover the transmit beam signals, the wavefront demultiplexing transform being an inverse of the wavefront multiplexing transform;

power amplifiers configured to amplify the recovered transmit beam signals; and an array antenna having a plurality of transmit elements configured to radiate the amplified transmit beam signals toward receiving elements of destinations in a multipath propagation environment.

6. The MIMO basestation of claim 5, wherein the outdoor RF tower further comprises:

RF blocks coupled to inputs of the power amplifiers respectively, and configured to perform frequency up-converting, bandpass filtering and buffer amplifying on the recovered transmit beam signals.

7. The MIMO basestation of claim 5, wherein the remote digital beam-forming network is configured to form multiple shaped transmit beam signals pointing to various directions within a field of view of the transmit elements of the array antenna.

8. The MIMO basestation of claim 5, wherein the remote MIMO transmitting processor further comprises a digital MIMO processing assembly configured to measure channel state information by measuring dynamically a plurality of point-to-point transfer functions, each of the point-to-point transfer functions indicating an amount of a propagation phase delay and associated relative attenuation from one of the transmit elements to one of the receiving elements, the transmit elements and the receiving elements being identified by respective indices, the point-to-point transfer functions being specified as functions of the respective indices.

9. The MIMO basestation of claim 8, wherein the digital MIMO processing assembly is further configured to compute composited transfer functions by combining, for each of the composited transfer functions, a corresponding set of the point-to-point transfer functions.

10. The MIMO basestation of claim 9, wherein the digital MIMO processing assembly performs optimization processing on the composited transfer functions in terms of the respective indices of the transmit elements and the receiving elements to achieve point-to-multipoint performance constraints.

11. A MIMO basestation for a cellular communications system comprising:

an outdoor RF tower comprising:
an array antenna having a plurality of receiving elements configured to capture signal streams from user transmit elements in a multipath propagation environment;
low noise amplifiers configured to amplify the captured signal streams;
analog-to-digital conversion blocks configured to convert the amplified signal streams to digital signal streams;
a pre-processor configured to perform a wavefront multiplexing transform on the digital signal streams, and generate wavefront multiplexed signal streams, each of the wavefront multiplexed signal streams being a linear combination of the digital signal streams; and RF-to optical drivers configured to perform optical modulating functions on the wavefront multiplexed signal streams to generate optical waveform streams; and optical fibers configured to couple the RF-to optical drivers to a remote indoor processing facility.

12. The MIMO basestation of claim 11, wherein the remote indoor processing facility comprises:

optical-to-RF converters configured to receive and optically demodulate the optical waveform streams to recover the wavefront multiplexed signal streams;

a post-processor for performing a wavefront demultiplexing transform on the recovered wavefront multiplexed signal streams to recover the digital signal streams, the wavefront demultiplexing transform being an inverse of the wavefront multiplexing transform;

a MIMO receiving processor configured to process the recovered digital signal streams; and a bank of RF demodulators configured to demodulate the recovered digital signal streams and generate corresponding data streams.

13. The MIMO basestation of claim 12, wherein the MIMO receiving processor comprises a remote digital beam-forming network configured to receive the recovered digital signal streams and generate corresponding receive beam signals.

14. The MIMO basestation of claim 13, wherein the remote digital beam-forming network is configured to form multiple shaped beams pointing various directions within a field of view of the receiving elements of the array antenna.

15. The MIMO basestation of claim 12, wherein the remote indoor processing facility further comprises:

a set of adaptive equalizers coupled to the post-processor and configured to perform distortion compensation for multichannel signals propagating in the optical fibers.

16. The MIMO basestation of claim 12, wherein the MIMO receiving processor is configured to process response signals sent by user transmit elements to measure channel state information.

17. The MIMO basestation of claim 12, wherein the MIMO receiving processor is configured to respond to probing signals sent by various user transmit elements with unique acknowledgement signals.

18. The MIMO basestation of claim 12, wherein the array antenna is configured to operate at current mobile cellular communications frequency bands or at frequency bands of a planned 5G cellular system.

19. The MIMO basestation of claim 11, wherein optical communications between the outdoor RF tower and the remote indoor processing facility through the optical fibers are via a Passive Optical Network standard or a wavelength division multiplexing (WDM) standard.

20. The MIMO basestation of claim 11, wherein the wavefront multiplexing transform comprises one of a Hadamard transform matrix, a Fourier transform matrix, an N-to-N orthogonal matrix where N is an integer greater than 1, or an N-to-N full-rank matrix where N is an integer greater than 1.

* * * * *